(12) United States Patent
Kwon et al.

(10) Patent No.: US 12,533,711 B2
(45) Date of Patent: Jan. 27, 2026

(54) DUAL AND MULTIPLE MEMBRANE MICROMACHINED ULTRASOUND TRANSDUCERS

(71) Applicant: Exo Imaging, Inc., Santa Clara, CA (US)

(72) Inventors: Haesung Kwon, Austin, TX (US); Brian Bircumshaw, Orinda, CA (US); Sandeep Akkaraju, Wellesley, MA (US)

(73) Assignee: Exo Imaging, Inc., Santa Clara, CA (US)

( * ) Notice: Subject to any disclaimer, the term of this patent is extended or adjusted under 35 U.S.C. 154(b) by 818 days.

(21) Appl. No.: 17/929,521

(22) Filed: Sep. 2, 2022

(65) Prior Publication Data

US 2024/0075500 A1    Mar. 7, 2024

(51) Int. Cl.
| | | |
|---|---|---|
| *B06B 1/06* | (2006.01) | |
| *A61B 8/00* | (2006.01) | |
| *G01S 15/89* | (2006.01) | |

(52) U.S. Cl.
CPC .......... *B06B 1/0666* (2013.01); *A61B 8/4488* (2013.01); *G01S 15/8915* (2013.01)

(58) Field of Classification Search
CPC ... B06B 1/0666; B06B 1/0292; A61B 8/4488; A61B 8/4483
See application file for complete search history.

(56) References Cited

U.S. PATENT DOCUMENTS

| | | |
|---|---|---|
| 3,525,071 A | 8/1970 | Massa |
| 4,511,052 A | 4/1985 | Klein et al. |
| 5,127,410 A | 7/1992 | King et al. |
| 5,810,733 A | 9/1998 | Van et al. |
| 6,320,239 B1 | 11/2001 | Eccardt et al. |
| 6,775,388 B1 | 8/2004 | Pompei |
| 6,958,255 B2 | 10/2005 | Khuri-Yakub et al. |
| 7,449,821 B2 * | 11/2008 | Dausch ................ B06B 1/0622 310/365 |
| 8,988,971 B2 | 3/2015 | Mueller et al. |
| 9,917,244 B2 * | 3/2018 | Rais-Zadeh ............ H10N 30/40 |
| 10,605,903 B2 * | 3/2020 | von Ramm ......... G01S 7/52017 |
| 10,648,852 B2 * | 5/2020 | Akkaraju .............. B06B 1/0688 |
| 10,835,209 B2 | 11/2020 | Haque et al. |
| 10,856,846 B2 | 12/2020 | Davis |

(Continued)

FOREIGN PATENT DOCUMENTS

| | | |
|---|---|---|
| CA | 2825736 A1 | 5/2008 |
| CN | 106536067 A | 3/2017 |

(Continued)

OTHER PUBLICATIONS

International Search Report and Written Opinion of Application No. PCT/US22/42500, dated Jan. 4, 2023, 10 pages.

(Continued)

*Primary Examiner* — Pedro J Cuevas
(74) *Attorney, Agent, or Firm* — Morgan, Lewis & Bockius LLP

(57) ABSTRACT

Provided herein are micromachined ultrasonic transducers as well as imaging devices and assemblies comprising micromachined ultrasonic transducers (MUTs). The MUTs described herein have a plurality of membranes so as to improve acoustic power at higher frequencies.

40 Claims, 11 Drawing Sheets

(56) References Cited

U.S. PATENT DOCUMENTS

| | | | |
|---|---|---|---|
| 10,969,270 B2 * | 4/2021 | Akkaraju | G01S 15/02 |
| 11,313,717 B2 * | 4/2022 | Akkaraju | B06B 1/0292 |
| 11,498,097 B2 * | 11/2022 | Kumar | B81C 1/00158 |
| 11,774,280 B2 * | 10/2023 | Akkaraju | G01N 29/07 348/163 |
| 11,951,512 B2 * | 4/2024 | Kwon | G01N 29/2406 |
| 11,975,360 B2 * | 5/2024 | Kwon | A61B 8/546 |
| 12,316,295 B2 * | 5/2025 | Bousquet | H01L 21/185 |
| 2003/0028108 A1 | 2/2003 | Miller | |
| 2003/0235119 A1 | 12/2003 | Wien et al. | |
| 2006/0238067 A1 | 10/2006 | Dausch | |
| 2007/0239001 A1 | 10/2007 | Mehi et al. | |
| 2007/0299345 A1 | 12/2007 | Adachi et al. | |
| 2008/0134793 A1 | 6/2008 | Woychik et al. | |
| 2008/0296708 A1 | 12/2008 | Wodnicki et al. | |
| 2009/0122651 A1 | 5/2009 | Kupnik et al. | |
| 2010/0168583 A1 | 7/2010 | Dausch et al. | |
| 2012/0277639 A1 | 11/2012 | Pollock et al. | |
| 2013/0020698 A1 | 1/2013 | Hsieh et al. | |
| 2013/0026655 A1 | 1/2013 | Lee et al. | |
| 2013/0277772 A1 | 10/2013 | Bryzek | |
| 2013/0345567 A1 | 12/2013 | Sudol et al. | |
| 2014/0184027 A1 | 7/2014 | Rice et al. | |
| 2014/0187962 A1 | 7/2014 | Reiter | |
| 2014/0210019 A1 | 7/2014 | Nasiri et al. | |
| 2015/0061465 A1 | 3/2015 | Lee et al. | |
| 2015/0087991 A1 | 3/2015 | Chen et al. | |
| 2015/0097468 A1 | 4/2015 | Hajati et al. | |
| 2015/0265245 A1 * | 9/2015 | von Ramm | B06B 1/0625 600/443 |
| 2015/0282783 A1 | 10/2015 | Katsura et al. | |
| 2015/0364669 A1 * | 12/2015 | Rais-Zadeh | H03H 3/0072 257/76 |
| 2016/0009544 A1 | 1/2016 | Rothberg et al. | |
| 2016/0187301 A1 | 6/2016 | Gu | |
| 2016/0244324 A1 | 8/2016 | Gurin | |
| 2016/0338339 A1 | 11/2016 | Patton | |
| 2017/0128983 A1 | 5/2017 | Horsley et al. | |
| 2018/0003678 A1 | 1/2018 | Rothberg et al. | |
| 2019/0015072 A1 | 1/2019 | Deladi et al. | |
| 2019/0178849 A1 | 6/2019 | Abraham et al. | |
| 2019/0290243 A1 | 9/2019 | Bryzek et al. | |
| 2020/0269280 A1 * | 8/2020 | Rothberg | H10N 30/04 |
| 2021/0086231 A1 | 3/2021 | Bircumshaw et al. | |
| 2021/0088655 A1 | 3/2021 | Bircumshaw et al. | |
| 2021/0094070 A1 | 4/2021 | Bircumshaw et al. | |
| 2021/0153844 A1 | 5/2021 | Fredrick et al. | |
| 2021/0362189 A1 * | 11/2021 | Kumar | B81B 3/0021 |
| 2022/0166398 A1 * | 5/2022 | Bousquet | H10N 15/10 |
| 2023/0408450 A1 * | 12/2023 | Liu | G01N 29/022 |
| 2024/0276156 A1 * | 8/2024 | Ji | H10K 59/90 |

FOREIGN PATENT DOCUMENTS

| | | | | |
|---|---|---|---|---|
| CN | 107768335 A | | 3/2018 | |
| CN | 111001553 A | | 4/2020 | |
| CN | 112368085 B | * | 9/2021 | G01S 7/5208 |
| CN | 113729773 A | * | 12/2021 | G01S 7/5208 |
| CN | 113729773 B | * | 10/2024 | H10N 30/302 |
| JP | 2004130138 A | | 4/2004 | |
| JP | 2005103294 A | | 4/2005 | |
| JP | 2006094459 A | | 4/2006 | |
| JP | 2018029147 A | | 2/2018 | |
| JP | 2021087812 A | | 6/2021 | |
| JP | 6937092 B2 | * | 9/2021 | G01S 7/5208 |
| JP | 2021185700 A | * | 12/2021 | G01S 7/5208 |
| JP | 7417286 B2 | * | 1/2024 | H10N 30/302 |
| JP | 7681916 B2 | * | 5/2025 | H10N 30/852 |
| KR | 20160018235 A | | 2/2016 | |
| KR | 20170030605 A | | 3/2017 | |
| KR | 20200130470 A | * | 11/2020 | G01S 7/5208 |
| KR | 20210068634 A | * | 6/2021 | G01S 7/5208 |
| KR | 102278330 B1 | * | 7/2021 | G01S 7/5208 |
| KR | 102315801 B1 | * | 10/2021 | G01S 7/5208 |
| KR | 20210129244 A | * | 10/2021 | G01S 7/5208 |
| KR | 102519309 B1 | * | 4/2023 | H10N 30/302 |
| KR | 20230049766 A | * | 4/2023 | H10N 30/302 |
| KR | 102714920 B1 | * | 10/2024 | H10N 30/302 |
| KR | 20240148455 A | * | 10/2024 | H10N 30/302 |
| KR | 102811474 B1 | * | 5/2025 | H10N 30/852 |
| WO | WO-2008137030 A1 | | 11/2008 | |
| WO | WO-2014178163 A1 | | 11/2014 | |
| WO | WO-2016011000 A1 | | 1/2016 | |
| WO | WO-2017143307 A1 | | 8/2017 | |
| WO | WO-2019099681 A1 | * | 5/2019 | H10N 30/04 |
| WO | WO-2019222116 A1 | | 11/2019 | |
| WO | WO-2019222118 A1 | | 11/2019 | |
| WO | 2020182926 A1 | | 9/2020 | |
| WO | WO-2020198257 A1 | | 10/2020 | |
| WO | WO-2021079160 A1 | | 4/2021 | |
| WO | WO-2021102127 A1 | | 5/2021 | |
| WO | 2022210887 A1 | | 10/2022 | |

OTHER PUBLICATIONS

Mahn et al. Au—Sn solid-liquid interdiffusion (SLID) bonding for piezoelectric ultrasonic transducers. 2016 IEEE International Ultrasonics Symposium (IUS) Tours (pp. 1-4) (2016).

Youngil Kim et al: "2D capacitive micromachined ultrasound transducer using novel tiling based on silicon frame", Medical Imaging 2013: Ultrasonic Imaging, Tomography, and Therapy, vol. 8675, Mar. 29, 2013 (Mar. 29, 2013), pp. 86750E1-86750E7, XP093165351.

PCT/US2019/032060 International Search Report and Written Opinion dated Jul. 26, 2019.

PCT/US2019/032062 International Search Report and Written Opinion dated Jul. 29, 2019.

PCT/US2020/061261 International Search Report and Written Opinion dated Feb. 9, 2021.

PCT/US2021/056026 International Search Report and Written Opinion dated Jan. 28, 2022.

PCT/US2021/056669 International Search Report and Written Opinion dated Jan. 28, 2022.

PCT/US2022/012126 International Search Report and Written Opinion dated Apr. 1, 2022.

PCT/US2022/021556 International Search Report and Written Opinion dated Jul. 22, 2022.

PCT/US2022/021556 Invitation to Pay Additional Fees dated May 26, 2022.

Extended European Search Report in Application No. 21962691.8, dated Jun. 4, 2024, 13 pages.

* cited by examiner

DUAL AND MULTIPLE MEMBRANE MICROMACHINED ULTRASOUND TRANSDUCERS

BACKGROUND

Ultrasound is a common imaging modality and has many uses in industrial, manufacturing, medical, and other settings. For instance, non-intrusive imaging systems for imaging internal organs of a human body and displaying images of the internal organs transmit ultrasound signals into the human body and receives signals reflected from the organs to image such organs. Ultrasound also has non-imaging uses as well, such as for ablating tissue with High Intensity Focused Ultrasound (HIFU) or in manufacturing to manipulate and modify materials.

Ultrasound systems have traditionally employed piezoelectric transducers (e.g., PZT transducers) to generate the transmitted signals and/or receive reflected signals. More recently, smaller and more easily bulk-manufactured transducers using MEMS (microelectromechanical systems) technology have seen increased use. Such MEMS ultrasound transducers include capacitive micromachined ultrasound transducers (cMUTs) and piezoelectric micromachined ultrasound transducers (pMUTs). While MEMS ultrasound transducers have many advantages, improvements are still desired.

SUMMARY

The present disclosure relates to ultrasound systems, devices, and methods, particularly using ultrasound and improved MEMS ultrasound transducers.

One aspect provided herein is a micromachined ultrasonic transducer (MUT), comprising: a substrate having a first resonant cavity and a second resonant cavity; a membrane coupled to at least a portion of the substrate, wherein: a first portion of the membrane covers the first cavity; and a second portion of the membrane covers the second cavity; a primary first electrode coupled to the first portion of the membrane; a secondary first electrode coupled to the primary first electrode; a primary second electrode coupled to the second portion of the membrane; and a secondary second electrode coupled to the primary second electrode.

In some embodiments, the substrate further comprises a third resonant cavity, the membrane further comprises a third portion covering the third cavity, and the MUT further comprises a primary third electrode coupled to the third portion of the membrane and a secondary third electrode coupled to the primary third electrode. In some embodiments, the first cavity, the second cavity, the third cavity, or any combination thereof have a shape of a circle, an oval, a half-circle, a half-oval, a triangle, a square, a rectangle, a hexagon, or an octagon. In some embodiments, the first cavity and the third cavity have a shape of a circle. In some embodiments, the first cavity has a greater diameter than the third cavity. In some embodiments, the first cavity has a smaller diameter than the third cavity. In some embodiments, the first cavity and the third cavity have equivalent diameters. In some embodiments, the first cavity and the third cavity are asymmetrical about a ray bisecting the first cavity. In some embodiments, the first cavity and the third cavity are symmetrical about a ray bisecting the first cavity. In some embodiments, a ratio between a distance between the ray bisecting the first cavity and the center of the second cavity, and the diameter of the second cavity, is about 1:0.3 to about 1:1. In some embodiments, the first cavity has a shape comprising: a primary rounded distal portion having a primary diameter; a secondary rounded distal portion having a secondary diameter; and a mesial portion between the primary distal portion and the secondary distal portion. In some embodiments, the first cavity is symmetric about: a ray extending from a centerpoint of the primary rounded distal portion to a centerpoint of the secondary rounded distal portion; a ray bisecting the mesial portion; or both. In some embodiments, a ratio between a distance from the center of the primary rounded distal portion to the center of the secondary distal rounded portion, and a diameter of the primary rounded distal portion, the secondary rounded distal portion, or both is about 2:1 to about 5:1. In some embodiments, a ratio between a distance from the center of the primary rounded distal portion to the center of the secondary distal rounded portion, and a minimum width of the mesial portion is about 2:1 to about 7:1. In some embodiments, a ratio between and a diameter of the primary rounded distal portion, the secondary rounded distal portion, or both, and a minimum width of the mesial portion is about 1:1 to about 3:1. In some embodiments, the MUT further comprises one or more portions of a piezoelectric layer, wherein: the secondary first electrode is coupled to the primary first electrode by a first portion of the one or more piezoelectric layer portions; the secondary second electrode is coupled to the primary second electrode by a second portion of the one or more piezoelectric layer portions; the secondary third electrode is coupled to the primary third electrode by a third portion of the one or more piezoelectric layer portions, or any combination thereof. In some embodiments, the primary first electrode has a shape inwardly offset from the shape of the first cavity, the primary second electrode has a shape inwardly offset from the shape of the second cavity, the primary third electrode has a shape inwardly offset from the shape of the third cavity, or any combination thereof. In some embodiments, the secondary first electrode has a shape inwardly offset from the shape of the primary first electrode, the secondary second electrode has a shape inwardly offset from the shape of the primary second electrode, the secondary third electrode has a shape inwardly offset from the shape of the primary third electrode, or any combination thereof. In some embodiments, at least a portion of the membrane is formed of a plastic, a ceramic, or both. In some embodiments, at least a portion of the membrane is formed of the ceramic, wherein the ceramic comprises silicon. In some embodiments, the plastic comprises silicon. In some embodiments, at least a portion of the membrane has a thickness of about 1 µm to about 10 µm. In some embodiments, the MUT has a higher acoustic power at high frequencies than the same MUT without the second cavity, second portion of the membrane covering the second cavity, primary second electrode, and secondary second electrode (and/or without the third cavity, third portion of the membrane covering the third cavity, primary third electrode, and secondary third electrode). In some embodiments, the high frequencies comprise ultrasound frequencies greater or equal to 5 MHz.

Another aspect provided herein is an imaging device, comprising an array of the MUTs herein. In some embodiments, the array comprises a rectilinear array, a polar array, or a polygonal array. In some embodiments, the substrate, the membrane, or both of two or more adjacent MUTs in the array are continuous. In some embodiments, the device further comprises an Application Specific Integrated Circuit (ASIC) coupled to the array the MUTs. In some embodiments, each MUT represents a single pixel of an ultrasound image to be obtained by the device. In some embodiments, the device further comprises one or more cross-talk reduction elements disposed between adjacent MUTs in the array. In some embodiments, the one or more cross-talk reduction elements comprise a groove, a trench, an acoustic dampening material, or combinations thereof disposed between adjacent MUTs in the array.

Another aspect provided herein is an imaging assembly comprising: a components circuit; a memory; a communication unit; a signal processing circuit; and an imaging subassembly comprising: an acoustic absorbent layer; a control unit; the imaging device described herein; and a coating layer. In some embodiments, the imaging assembly further comprises a power source, a charging port, a display, or any combination thereof electrically coupled to the components circuit, the memory, the communication unit, the signal processing unit, the imaging subassembly, or any combination thereof. In some embodiments, one or more of the components circuit, the memory, the communication unit, the signal processing unit, and the imaging subassembly are electrically coupled. In some embodiments, the acoustic absorbent layer is proximal to the control unit, the control unit is proximal to the imaging device, the imaging device is proximal to the coating layer, or any combination thereof. In some embodiments, the coating layer is distal to the imaging device, the imaging device is distal to the control unit, the control unit is distal to the acoustic absorbent layer, or any combination thereof. In some embodiments, the power source comprises a battery. In some embodiments, the control unit comprises an Application Specific Integrated Circuit (ASIC) coupled to the array of the MUTs. In some embodiments, the coating layer comprises an acoustic lens.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1A:
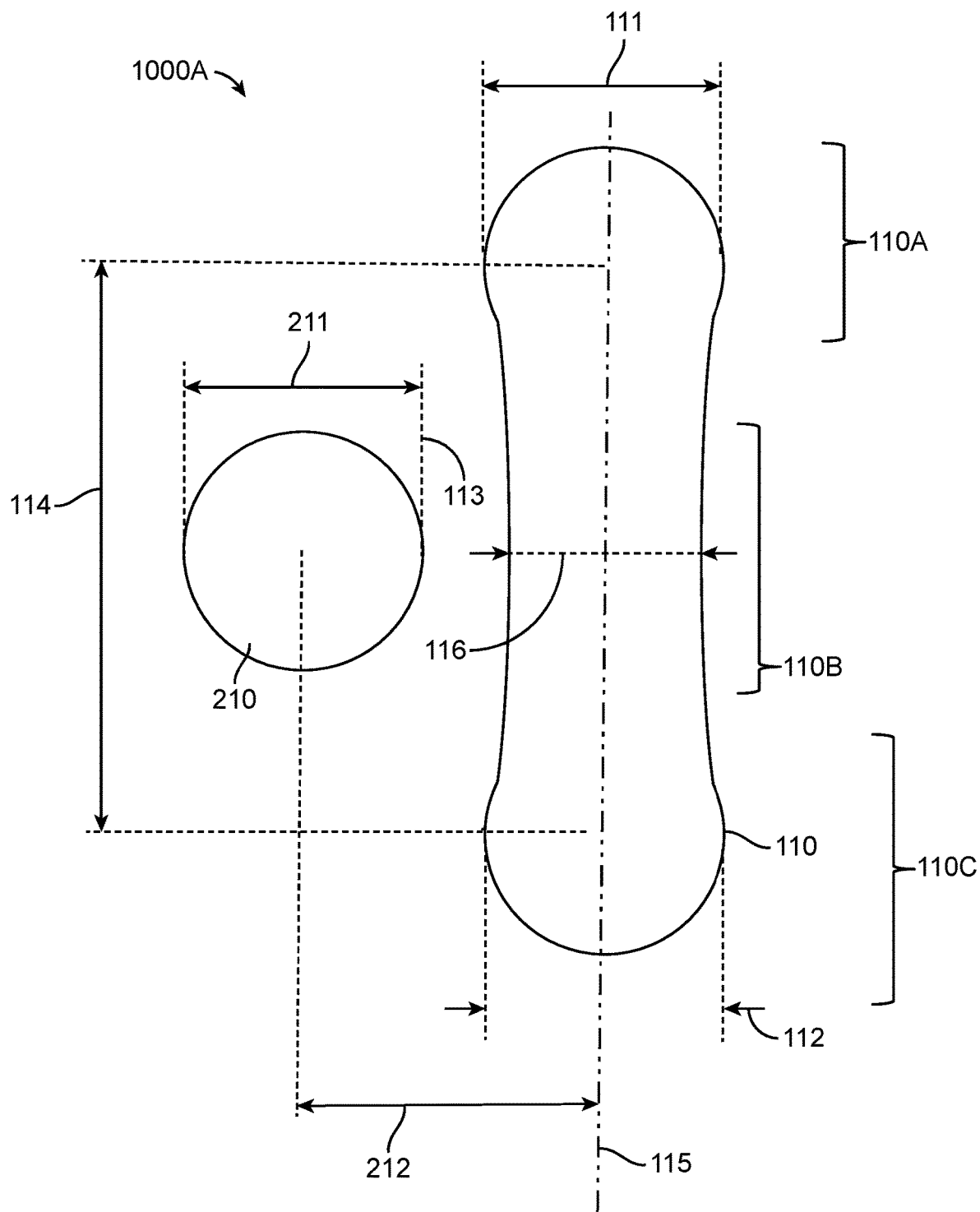
FIG. 1A shows a top-view illustration of an arrangement of first, second, and third membrane portions of an exemplary first primary micromachined ultrasonic transducer (MUT), per one or more embodiments herein.

Provided herein are imaging components and devices having micromachined ultrasound transducers (MUTs) Micromachined Ultrasonic Transducers One aspect provided herein, per FIG. 1A, is a micromachined ultrasonic transducer (MUT) 1000. As shown, in some embodiments, the MUT 1000 comprises a substrate 100, a membrane 500, a primary first electrode 120, a secondary first electrode 130, a primary second electrode 220, and a secondary second electrode 230. In some embodiments, the substrate 100 comprises a semiconductor material such as silicon and/or silicon dioxide. In some embodiments, the MUT 1000 is a pMUT. In some embodiments, the MUT 1000 is a cMUT.

In some embodiments, the substrate 100 has a first resonant cavity 110 and a second resonant cavity 210. In some embodiments, per FIG. 1B, the substrate 100 further comprises a resonant third cavity 310. In some embodiments, the substrate 100 comprises a first resonant cavity 110 and a second resonant cavity 210 and does not comprise a third resonant cavity 310.

In some embodiments, the membrane 500 is coupled to at least a portion of the substrate 100. As shown, a first portion 150 of the membrane 500 covers the first cavity 110 and a second portion 250 of the membrane 500 covers the second cavity 210. As shown, in some embodiments, the membrane 500 further comprises a third portion 350 covering the third cavity 310.

Figure 2:
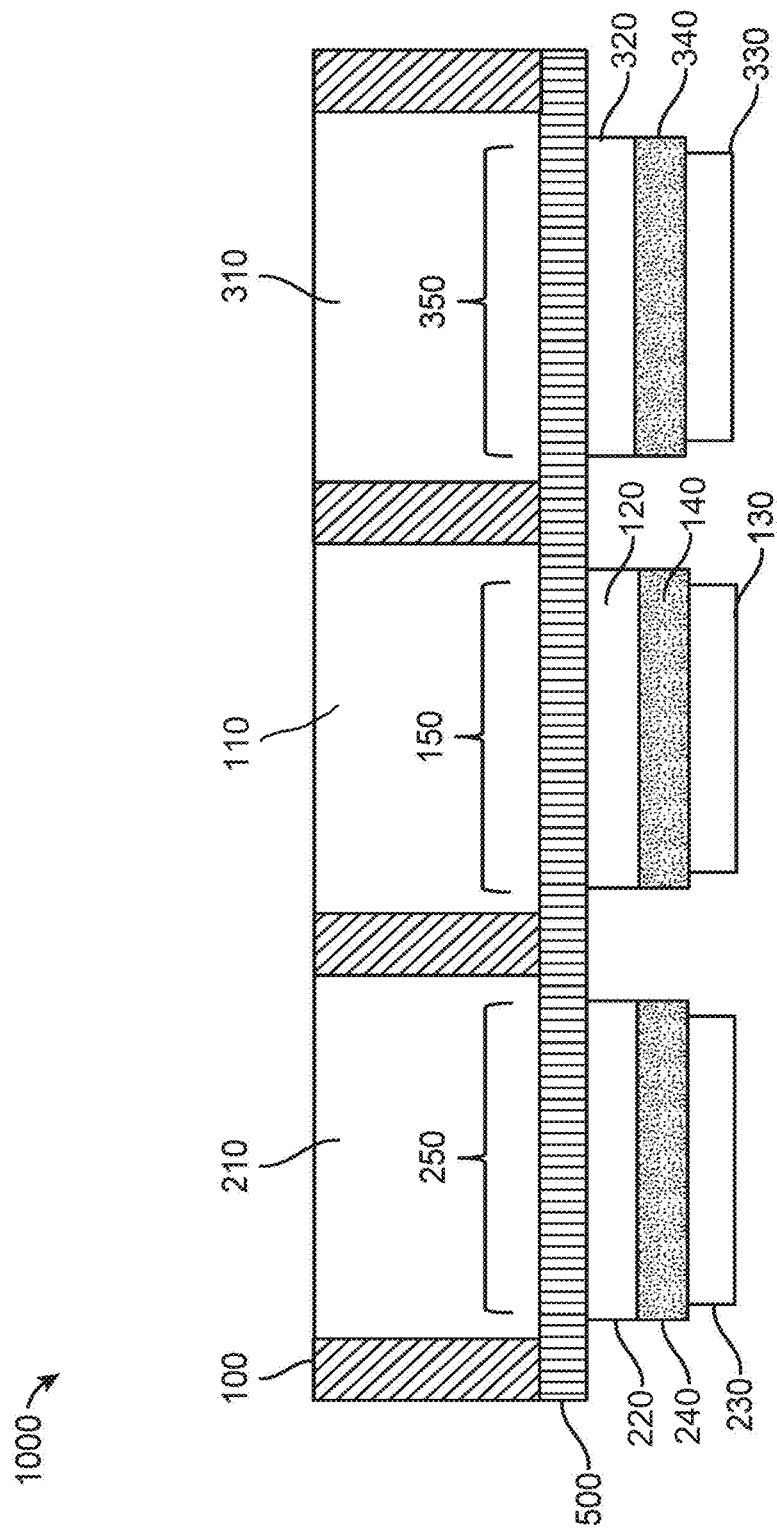
FIG. 2 shows a side cross-sectional illustration of an exemplary MUT, per one or more embodiments herein.
Figure 3A:
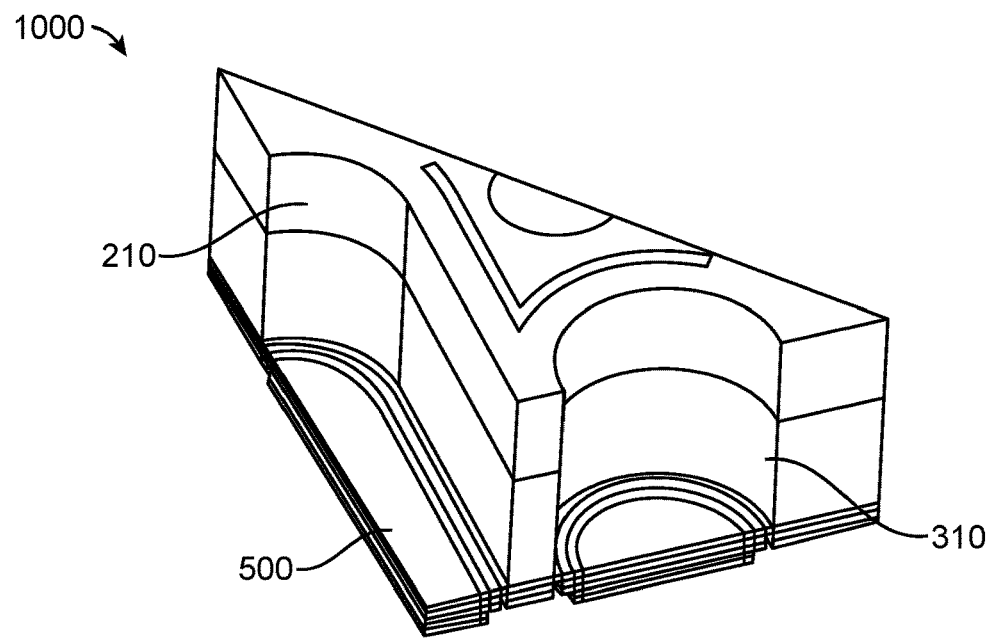
FIG. 3A shows a top-front-left perspective cross-sectional illustration of an exemplary MUT, per one or more embodiments herein.
Figure 3B:
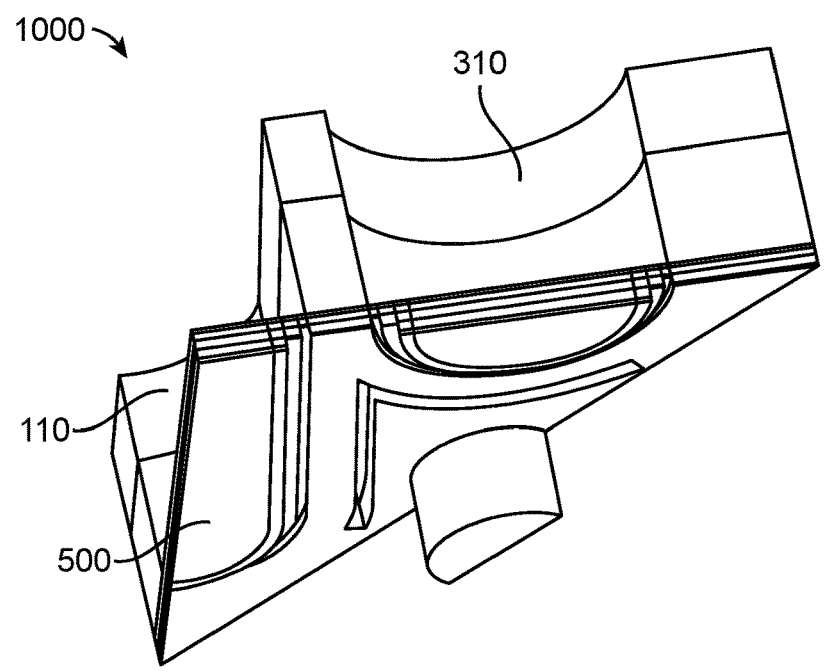
FIG. 3B shows a bottom-front-left perspective cross-sectional illustration of an exemplary MUT, per one or more embodiments herein.

Referring now to FIG. 2, in some embodiments, the primary first electrode 120 (bottom) is coupled to the first portion 150 of the membrane 500, wherein the secondary first electrode 130 (top) is coupled to the primary first electrode 120 via piezoelectric layer 140. In some embodiments, the primary second electrode 220 (bottom) is coupled to the second portion 250 of the membrane 500, wherein the secondary second electrode 230 (top) is coupled to the primary second electrode 220 via piezoelectric layer 240. In some embodiments, the MUT 1000 further comprises a primary third electrode 320 (bottom) coupled to the third portion 350 of the membrane 500, wherein the secondary third electrode 330 (top) is coupled to the primary third electrode 320 via piezoelectric layer 340.

Figure 1B:
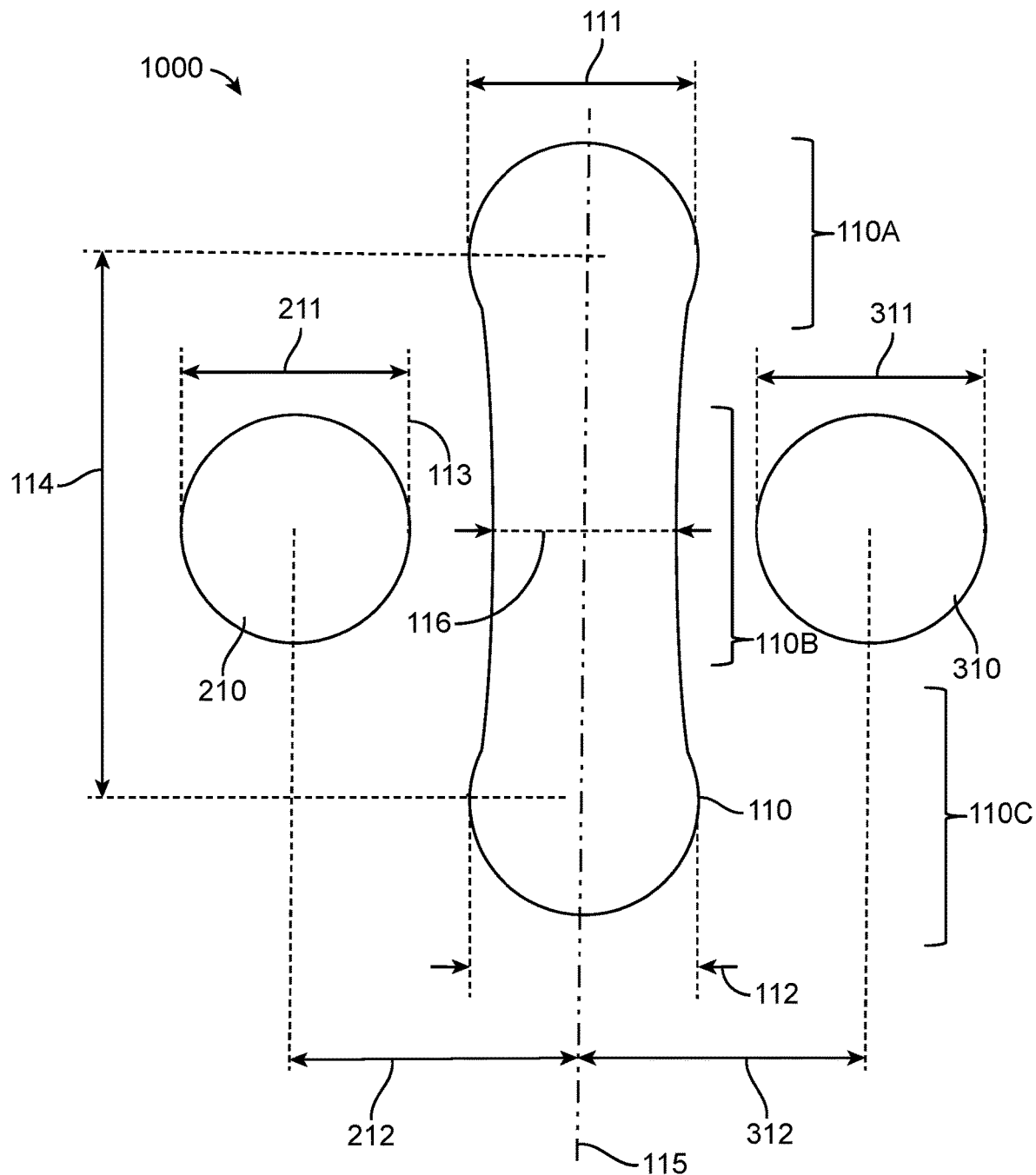
FIG. 1B shows a top-view illustration of an arrangement of first, second, and third membrane portions of an exemplary second primary micromachined ultrasonic transducer (MUT), per one or more embodiments herein.

In some embodiments, per FIG. 1B, the first cavity 110, the second cavity 210, the third cavity 310, or any combination thereof, have a polygonal shape. In some embodiments, the first cavity 110, the second cavity 210, the third cavity 310, or any combination thereof have a shape of a circle, an oval, a half-circle, a half-oval, a triangle, a square, a hexagon, a rectangle, an octagon, or any other polygon. In some embodiments, the first cavity 110, the second cavity 210, the third cavity 310, or any combination thereof have a closed shape. In some embodiments, the first cavity 110, the second cavity 210, the third cavity 310, or any combination thereof have a shape comprising one or more straight edges, one or more curved edges, or both. In some embodiments, the first cavity 110 and the third cavity 310 have a shape of a circle. In some embodiments, the shape of the first cavity 110, the second cavity 210, the third cavity 310, or any combination thereof is defined as a distal or a proximal edge's shape. In some embodiments, the electrodes 120 and 130, 220 and 230, and 320 and 330 positioned over the cavities 110, 210, and 310, respectively, have shape corresponding to the cavities 110, 210, and 310, as shown in FIG. 1A, for example, with electrodes 120, 130, 220, 230, 320, and 330. In some embodiments, (i) the first cavity 110 and the secondary first electrode 130 (top) has a cross-sectional shape like a snowboard (i.e., rectangular with enlarged curved ends) and has (ii) the second cavity 210 and secondary second electrode 230 (top) and (iii) the third cavity 310 and secondary third electrode 330 (top) in the shape of circles positioned on both lateral sides of the (i) the first cavity 110 and the secondary first electrode 130 (top). In some embodiments, the snowboard shape of the first cavity 110 enables an increased acoustic power and directivity of the MUTs 1000 herein.

Figure 5A:
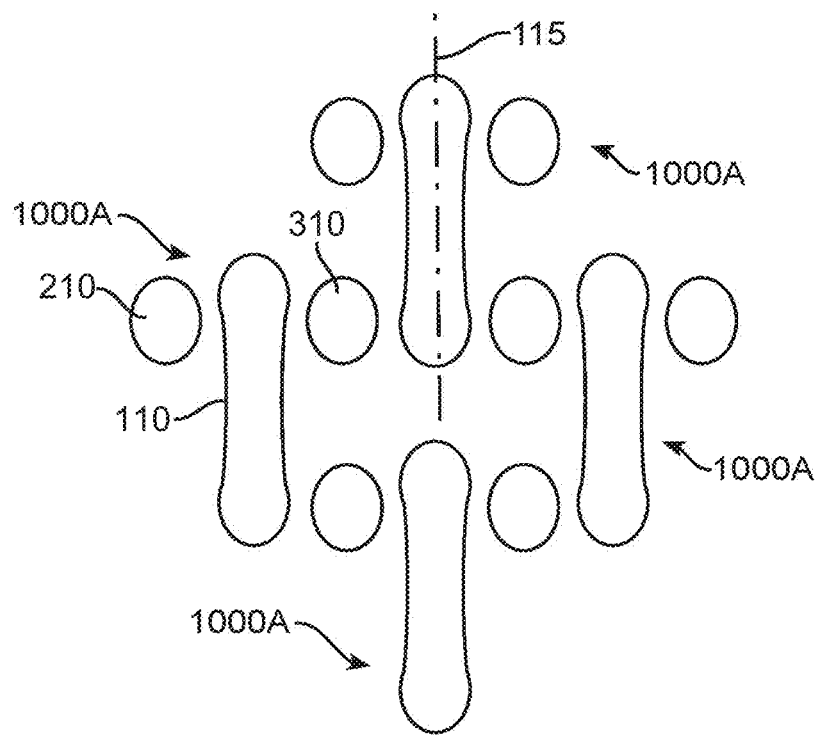
FIG. 5A shows a top-view illustration of a secondary arrangement of first, second, and third membrane portions of an exemplary second MUT, per one or more embodiments herein.
Figure 5B:
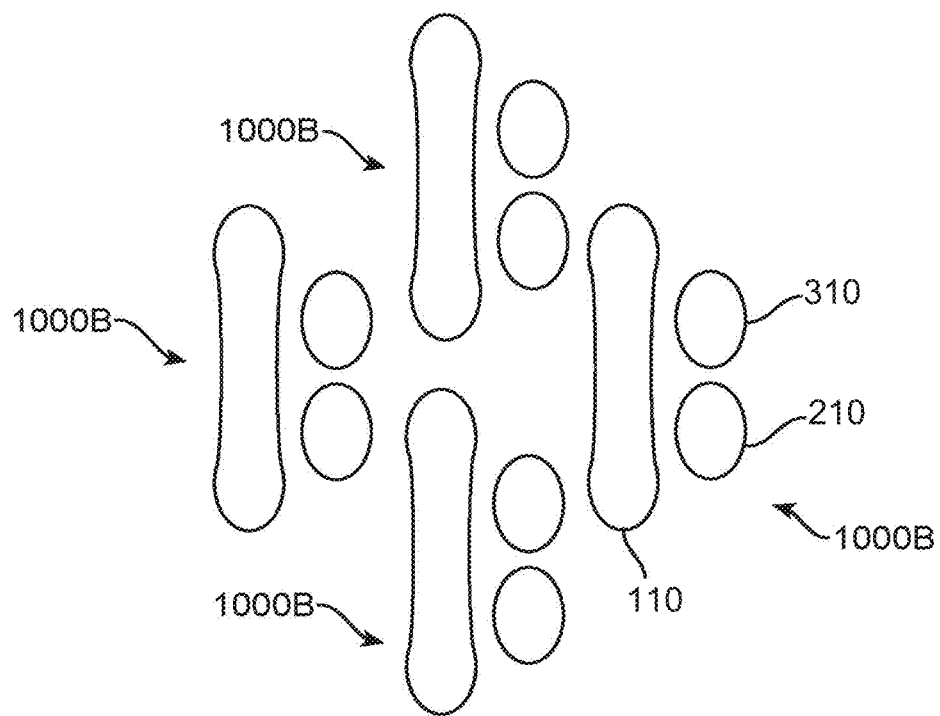
FIG. 5B shows a top-view illustration of a tertiary arrangement of first, second, and third membrane portions of an exemplary third MUT, per one or more embodiments herein.

In some embodiments, a diameter 211 of the second cavity 210 is greater than a diameter 311 of the third cavity 310. In some embodiments, a diameter 211 of the second cavity 210 is less than a diameter 311 of the third cavity 310. In some embodiments, a diameter 211 of the second cavity 210 is equivalent to a diameter 311 of the third cavity 310. In some embodiments, per the exemplary MUTs shown in FIG. 5B, the second cavity 210 and third cavity 310 are asymmetrical about a ray 115 bisecting the first cavity 110. In some embodiments, per the exemplary first and second MUTs shown in FIGS. 1A and 5A, respectively, the second cavity 210 and third cavity 310 are symmetrical about a ray 115 bisecting the first cavity 110. In some embodiments, the shapes and orientations of the electrodes 120 130 220 230 320 330 positioned over the cavities 110 210 310 enables an increased acoustic power and directivity of the MUTs 1000 herein.

In some embodiments, a ratio between a distance 212 between the ray 115 bisecting the first cavity 110 and the center of the second cavity 210, and the diameter 211 of the second cavity 210 is about 1:1 to about 3:1. In some embodiments, a ratio between a distance 212 between the ray 115 bisecting the first cavity 110 and the center of the second cavity 210, and the diameter 211 of the second cavity 210 is about 1:1 to about 1.25:1, about 1:1 to about 1.5:1, about 1:1 to about 1.75:1, about 1:1 to about 2:1, about 1:1 to about 2.25:1, about 1:1 to about 2.5:1, about 1:1 to about 2.75:1, about 1:1 to about 3:1, about 1.25:1 to about 1.5:1, about 1.25:1 to about 1.75:1, about 1.25:1 to about 2:1, about 1.25:1 to about 2.25:1, about 1.25:1 to about 2.5:1, about 1.25:1 to about 2.75:1, about 1.25:1 to about 3:1, about 1.5:1 to about 1.75:1, about 1.5:1 to about 2:1, about 1.5:1 to about 2.25:1, about 1.5:1 to about 2.5:1, about 1.5:1 to about 2.75:1, about 1.5:1 to about 3:1, about 1.75:1 to about 2:1, about 1.75:1 to about 2.25:1, about 1.75:1 to about 2.5:1, about 1.75:1 to about 2.75:1, about 1.75:1 to about 3:1, about 2:1 to about 2.25:1, about 2:1 to about 2.5:1, about 2:1 to about 2.75:1, about 2:1 to about 3:1, about 2.25:1 to about 2.5:1, about 2.25:1 to about 2.75:1, about 2.25:1 to about 3:1, about 2.5:1 to about 2.75:1, about 2.5:1 to about 3:1, or about 2.75:1 to about 3:1, including increments therein. In some embodiments, a ratio between a distance 212 between the ray 115 bisecting the first cavity 110 and the center of the second cavity 210, and the diameter 211 of the second cavity 210 is about 1:1, about 1.25:1, about 1.5:1, about 1.75:1, about 2:1, about 2.25:1, about 2.5:1, about 2.75:1, or about 3:1. In some embodiments, a ratio between a distance 212 between the ray 115 bisecting the first cavity 110 and the center of the second cavity 210, and the diameter 211 of the second cavity 210 is at least about 1:1, about 1.25:1, about 1.5:1, about 1.75:1, about 2:1, about 2.25:1, about 2.5:1, or about 2.75:1. In some embodiments, a ratio between a distance 212 between the ray 115 bisecting the first cavity 110 and the center of the second cavity 210, and the diameter 211 of the second cavity 210 is at most about 1.25:1, about 1.5:1, about 1.75:1, about 2:1, about 2.25:1, about 2.5:1, about 2.75:1, or about 3:1.

In some embodiments, a ratio between a distance 312 between the ray 115 bisecting the first cavity 110 and the center of the third cavity 310, and the diameter 311 of the third cavity 310 is about 1:1 to about 3:1. In some embodiments, a ratio between a distance 312 between the ray 115 bisecting the first cavity 110 and the center of the third cavity 310, and the diameter 311 of the third cavity 310 is about 1:1 to about 1.25:1, about 1:1 to about 1.5:1, about 1:1 to about 1.75:1, about 1:1 to about 2:1, about 1:1 to about 2.25:1, about 1:1 to about 2.5:1, about 1:1 to about 2.75:1, about 1:1 to about 3:1, about 1.25:1 to about 1.5:1, about 1.25:1 to about 1.75:1, about 1.25:1 to about 2:1, about 1.25:1 to about 2.25:1, about 1.25:1 to about 2.5:1, about 1.25:1 to about 2.75:1, about 1.25:1 to about 3:1, about 1.5:1 to about 1.75:1, about 1.5:1 to about 2:1, about 1.5:1 to about 2.25:1, about 1.5:1 to about 2.5:1, about 1.5:1 to about 2.75:1, about 1.5:1 to about 3:1, about 1.75:1 to about 2:1, about 1.75:1 to about 2.25:1, about 1.75:1 to about 2.5:1, about 1.75:1 to about 2.75:1, about 1.75:1 to about 3:1, about 2:1 to about 2.25:1, about 2:1 to about 2.5:1, about 2:1 to about 2.75:1, about 2:1 to about 3:1, about 2.25:1 to about 2.5:1, about 2.25:1 to about 2.75:1, about 2.25:1 to about 3:1, about 2.5:1 to about 2.75:1, about 2.5:1 to about 3:1, or about 2.75:1 to about 3:1, including increments therein. In some embodiments, a ratio between a distance 312 between the ray 115 bisecting the first cavity 110 and the center of the third cavity 310, and the diameter 311 of the third cavity 310 is about 1:1, about 1.25:1, about 1.5:1, about 1.75:1, about 2:1, about 2.25:1, about 2.5:1, about 2.75:1, or about 3:1. In some embodiments, a ratio between a distance 312 between the ray 115 bisecting the first cavity 110 and the center of the third cavity 310, and the diameter 311 of the third cavity 310 is at least about 1:1, about 1.25:1, about 1.5:1, about 1.75:1, about 2:1, about 2.25:1, about 2.5:1, or about 2.75:1. In some embodiments, a ratio between a distance 312 between the ray 115 bisecting the first cavity 110 and the center of the third cavity 310, and the diameter 311 of the third cavity 310 is at most about 1.25:1, about 1.5:1, about 1.75:1, about 2:1, about 2.25:1, about 2.5:1, about 2.75:1, or about 3:1. In some embodiments, the dimensions and ratios of the electrodes 120 and 130, 220 and 230, and 320 and 330 positioned over the cavities 110, 210, and 310, respectively, enables an increased acoustic power and directivity of the MUTs 100 herein.

In some embodiments, per FIG. 1, in a primary example of MUT 1000, the first cavity 110 and complementary electrodes 120, 130 have a shape comprising a primary rounded distal portion 110A having a primary diameter 111, a secondary rounded distal portion 110C having a secondary diameter 112, and a mesial portion 110B between the primary distal portion 110A and the secondary distal portion 110C. In some embodiments, the first cavity 110 and complementary electrodes 120, 130 are is symmetric about the ray 116 extending from a centerpoint of the primary rounded distal portion 110A to a centerpoint of the secondary rounded distal portion 110C. In some embodiments, the first cavity 110 and complementary electrodes 120, 130 are symmetric about the ray 116 bisecting the mesial portion 110B. In some embodiments, the first cavity 110 and complementary electrodes 120, 130 are asymmetric about the ray 115 extending from a centerpoint of the primary rounded distal portion 110A to a centerpoint of the secondary rounded distal portion 110C. In some embodiments, the first cavity 110 and complementary electrodes 120, 130 are asymmetric about the ray 116 bisecting the mesial portion 110B. In some embodiments, the first cavity 110 and complementary electrodes 120, 130 are symmetric about an axial ray 115 that is perpendicular to the ray 116 bisecting the mesial portion 110B.

In some embodiments, a ratio between a distance 113 from the center of the primary rounded distal portion 110A to the center of the secondary distal rounded portion 110C, and a diameter 111 of the primary rounded distal portion 110A, a diameter 112 of the secondary rounded distal portion 110C, or both is about 3:1 to about 5:1. In some embodiments, a ratio between a distance 113 from the center of the primary rounded distal portion 110A to the center of the secondary distal rounded portion 110C, and a diameter 111 of the primary rounded distal portion 110A, a diameter 112 of the secondary rounded distal portion 110C, or both is about 3:1 to about 3.25:1, about 3:1 to about 3.5:1, about 3:1 to about 3.75:1, about 3:1 to about 4:1, about 3:1 to about 4.25:1, about 3:1 to about 4.5:1, about 3:1 to about 4.75:1, about 3:1 to about 5:1, about 3.25:1 to about 3.5:1, about 3.25:1 to about 3.75:1, about 3.25:1 to about 4:1, about 3.25:1 to about 4.25:1, about 3.25:1 to about 4.5:1, about 3.25:1 to about 4.75:1, about 3.25:1 to about 5:1, about 3.5:1 to about 3.75:1, about 3.5:1 to about 4:1, about 3.5:1 to about 4.25:1, about 3.5:1 to about 4.5:1, about 3.5:1 to about 4.75:1, about 3.5:1 to about 5:1, about 3.75:1 to about 4:1, about 3.75:1 to about 4.25:1, about 3.75:1 to about 4.5:1, about 3.75:1 to about 4.75:1, about 3.75:1 to about 5:1, about 4:1 to about 4.25:1, about 4:1 to about 4.5:1, about 4:1 to about 4.75:1, about 4:1 to about 5:1, about 4.25:1 to about 4.5:1, about 4.25:1 to about 4.75:1, about 4.25:1 to about 5:1, about 4.5:1 to about 4.75:1, about 4.5:1 to about 5:1, or about 4.75:1 to about 5:1, including increments therein. In some embodiments, a ratio between a distance 113 from the center of the primary rounded distal portion 110A to the center of the secondary distal rounded portion 110C, and a diameter 111 of the primary rounded distal portion 110A, a diameter 112 of the secondary rounded distal portion 110C, or both is about 3:1, about 3.25:1, about 3.5:1, about 3.75:1, about 4:1, about 4.25:1, about 4.5:1, about 4.75:1, or about 5:1. In some embodiments, a ratio between a distance 113 from the center of the primary rounded distal portion 110A to the center of the secondary distal rounded portion 110C, and a diameter 111 of the primary rounded distal portion 110A, a diameter 112 of the secondary rounded distal portion 110C, or both is at least about 3:1, about 3.25:1, about 3.5:1, about 3.75:1, about 4:1, about 4.25:1, about 4.5:1, or about 4.75:1. In some embodiments, a ratio between a distance 113 from the center of the primary rounded distal portion 110A to the center of the secondary distal rounded portion 110C, and a diameter 111 of the primary rounded distal portion 110A, a diameter 112 of the secondary rounded distal portion 110C, or both is at most about 3.25:1, about 3.5:1, about 3.75:1, about 4:1, about 4.25:1, about 4.5:1, about 4.75:1, or about 5:1.

In some embodiments, a ratio between a distance 114 from the center of the primary rounded distal portion 110A to the center of the secondary distal rounded portion 110C, and a minimum width 113 of the mesial portion 110B is about 2:1 to about 7:1. In some embodiments, a ratio between a distance 114 from the center of the primary rounded distal portion 110A to the center of the secondary distal rounded portion 110C, and a minimum width 113 of the mesial portion 110B is about 2:1 to about 2.5:1, about 2:1 to about 3:1, about 2:1 to about 3.5:1, about 2:1 to about 4:1, about 2:1 to about 4.5:1, about 2:1 to about 5:1, about 2:1 to about 5.5:1, about 2:1 to about 6:1, about 2:1 to about 6.5:1, about 2:1 to about 7:1, about 2.5:1 to about 3:1, about 2.5:1 to about 3.5:1, about 2.5:1 to about 4:1, about 2.5:1 to about 4.5:1, about 2.5:1 to about 5:1, about 2.5:1 to about 5.5:1, about 2.5:1 to about 6:1, about 2.5:1 to about 6.5:1, about 2.5:1 to about 7:1, about 3:1 to about 3.5:1, about 3:1 to about 4:1, about 3:1 to about 4.5:1, about 3:1 to about 5:1, about 3:1 to about 5.5:1, about 3:1 to about 6:1, about 3:1 to about 6.5:1, about 3:1 to about 7:1, about 3.5:1 to about 4:1, about 3.5:1 to about 4.5:1, about 3.5:1 to about 5:1, about 3.5:1 to about 5.5:1, about 3.5:1 to about 6:1, about 3.5:1 to about 6.5:1, about 3.5:1 to about 7:1, about 4:1 to about 4.5:1, about 4:1 to about 5:1, about 4:1 to about 5.5:1, about 4:1 to about 6:1, about 4:1 to about 6.5:1, about 4:1 to about 7:1, about 4.5:1 to about 5:1, about 4.5:1 to about 5.5:1, about 4.5:1 to about 6:1, about 4.5:1 to about 6.5:1, about 4.5:1 to about 7:1, about 5:1 to about 5.5:1, about 5:1 to about 6:1, about 5:1 to about 6.5:1, about 5:1 to about 7:1, about 5.5:1 to about 6:1, about 5.5:1 to about 6.5:1, about 5.5:1 to about 7:1, about 6:1 to about 6.5:1, about 6:1 to about 7:1, or about 6.5:1 to about 7:1, including increments therein. In some embodiments, a ratio between a distance 114 from the center of the primary rounded distal portion 110A to the center of the secondary distal rounded portion 110C, and a minimum width 113 of the mesial portion 110B is about 2:1, about 2.5:1, about 3:1, about 3.5:1, about 4:1, about 4.5:1, about 5:1, about 5.5:1, about 6:1, about 6.5:1, or about 7:1. In some embodiments, a ratio between a distance 114 from the center of the primary rounded distal portion 110A to the center of the secondary distal rounded portion 110C, and a minimum width 113 of the mesial portion 110B is at least about 2:1, about 2.5:1, about 3:1, about 3.5:1, about 4:1, about 4.5:1, about 5:1, about 5.5:1, about 6:1, or about 6.5:1. In some embodiments, a ratio between a distance 114 from the center of the primary rounded distal portion 110A to the center of the secondary distal rounded portion 110C, and a minimum width 113 of the mesial portion 110B is at most about 2.5:1, about 3:1, about 3.5:1, about 4:1, about 4.5:1, about 5:1, about 5.5:1, about 6:1, about 6.5:1, or about 7:1.

In some embodiments, a ratio between and a diameter 111 of the primary rounded distal portion 110A, a diameter 112 of the secondary rounded distal portion 110C, or both, and a minimum width 113 of the mesial portion 110B is about 1:1 to about 3:1. In some embodiments, a ratio between and a diameter 111 of the primary rounded distal portion 110A, a diameter 112 of the secondary rounded distal portion 110C, or both, and a minimum width 113 of the mesial portion 110B is about 1:1 to about 1.25:1, about 1:1 to about 1.5:1, about 1:1 to about 1.75:1, about 1:1 to about 2:1, about 1:1 to about 2.25:1, about 1:1 to about 2.5:1, about 1:1 to about 2.75:1, about 1:1 to about 3:1, about 1.25:1 to about 1.5:1, about 1.25:1 to about 1.75:1, about 1.25:1 to about 2:1, about 1.25:1 to about 2.25:1, about 1.25:1 to about 2.5:1, about 1.25:1 to about 2.75:1, about 1.25:1 to about 3:1, about 1.5:1 to about 1.75:1, about 1.5:1 to about 2:1, about 1.5:1 to about 2.25:1, about 1.5:1 to about 2.5:1, about 1.5:1 to about 2.75:1, about 1.5:1 to about 3:1, about 1.75:1 to about 2:1, about 1.75:1 to about 2.25:1, about 1.75:1 to about 2.5:1, about 1.75:1 to about 2.75:1, about 1.75:1 to about 3:1, about 2:1 to about 2.25:1, about 2:1 to about 2.5:1, about 2:1 to about 2.75:1, about 2:1 to about 3:1, about 2.25:1 to about 2.5:1, about 2.25:1 to about 2.75:1, about 2.25:1 to about 3:1, about 2.5:1 to about 2.75:1, about 2.5:1 to about 3:1, or about 2.75:1 to about 3:1, including increments therein. In some embodiments, a ratio between and a diameter 111 of the primary rounded distal portion 110A, a diameter 112 of the secondary rounded distal portion 110C, or both, and a minimum width 113 of the mesial portion 110B is about 1:1, about 1.25:1, about 1.5:1, about 1.75:1, about 2:1, about 2.25:1, about 2.5:1, about 2.75:1, or about 3:1. In some embodiments, a ratio between and a diameter 111 of the primary rounded distal portion 110A, a diameter 112 of the secondary rounded distal portion 110C, or both, and a minimum width 113 of the mesial portion 110B is at least about 1:1, about 1.25:1, about 1.5:1, about 1.75:1, about 2:1, about 2.25:1, about 2.5:1, or about 2.75:1. In some embodiments, a ratio between and a diameter 111 of the primary rounded distal portion 110A, a diameter 112 of the secondary rounded distal portion 110C, or both, and a minimum width 113 of the mesial portion 110B is at most about 1.25:1, about 1.5:1, about 1.75:1, about 2:1, about 2.25:1, about 2.5:1, about 2.75:1, or about 3:1.

Figure 5C:
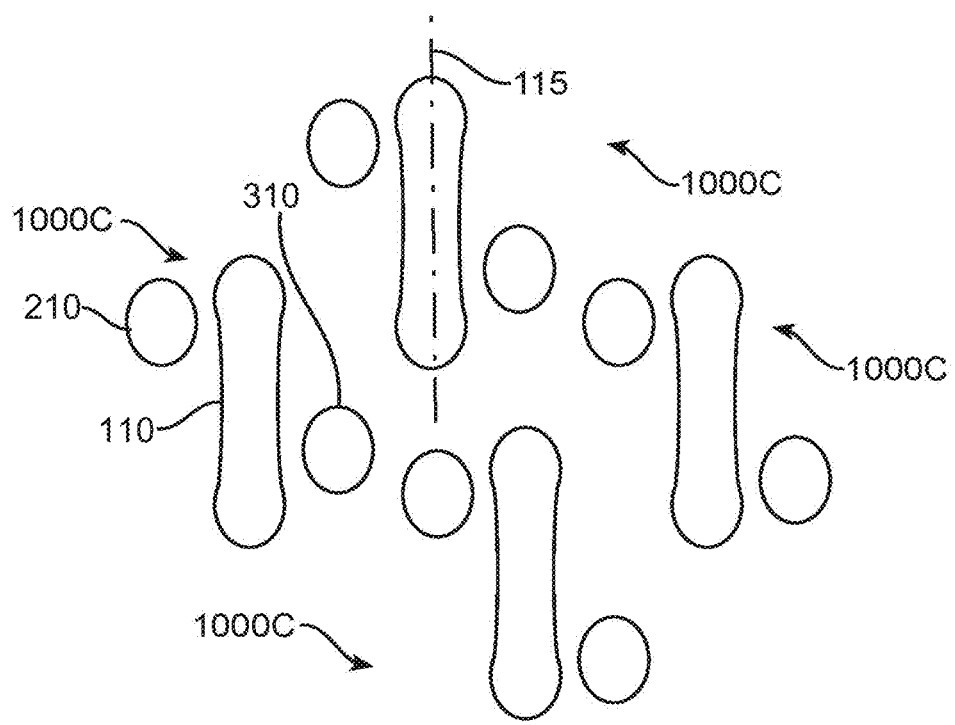
FIG. 5C shows a top-view illustration of a quaternary arrangement of first, second, and third membrane portions of an exemplary MUT, per one or more embodiments herein.
Figure 5D:
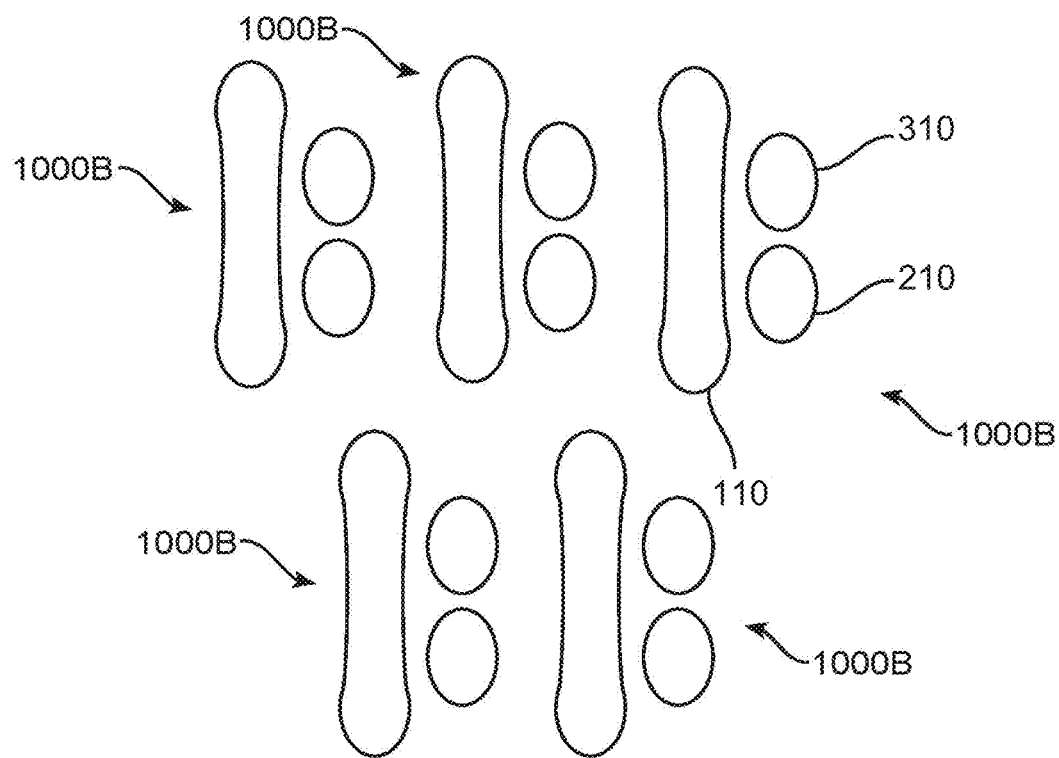
FIG. 5D shows a top-view illustration of a quinary arrangement of first, second, and third membrane portions of an exemplary MUT, per one or more embodiments herein.

In some embodiments, per FIG. 1, a centerpoint of the second cavity 210 and a centerpoint of the third cavity 310 are coincident with the ray 115 bisecting the first cavity 110. In some embodiments, per FIG. 5A, with MUTs 1000A similar to MUTs 1000, a centerpoint of the second cavity 210 and the third cavity 310 are coincident with a centerpoint of the primary diameter 111 of the first cavity 110. In some embodiments, per FIG. 5B, with MUTs 1000B similar to MUTs 1000, the second cavity 210 and the third cavity 310 are located on the same side of the first cavity 110, wherein a ray connecting the center of the second cavity 210 and the center of third cavity 310 is parallel with the vertical ray 115. FIGS. 5C-5D show top-view illustrations of additional exemplary arrangements of the first, second, and third membrane portions of a MUT 1000C 1000B. In FIG. 5C, the second cavity 210 and the third cavity 310 of a MUT 1000C are located oppositely about the vertical ray 115, but not symmetrically about an axis perpendicular to the vertical ray 115. As shown, in some embodiments, the vertical ray 115 of one MUT 1000C bisects the second cavity 420 of another MUT 1000C below. In FIG. 5C, unlike the parallelogram array of FIG. 5A, the array in some cases is an offset triangular array.

In some embodiments, the MUT 1000 further comprises one or more portions of a piezoelectric layer 600. In some embodiments, the MUT 1000 is a piezoelectric micromachined ultrasound transducer (pMUT). In some embodiments, per FIG. 2, the secondary first electrode 130 (top) is coupled to the primary first electrode 120 (bottom) by a first portion of the one or more piezoelectric layer 600 portions. Further, in some embodiments, the secondary second electrode 230 (top) is coupled to the primary second electrode 220 (bottom) by a second portion of the one or more piezoelectric layer 600 portions, and the secondary third electrode 330 (top) is coupled to the primary third electrode 320 320 (bottom) by a third portion of the one or more piezoelectric layer 600 portions, or any combination thereof. In some embodiments, the piezoelectric layer(s) include at least one of PZT, PZT-N, PMN-Pt, AlN, Sc-AlN, ZnO, PVDF, and LiNiO3.

In some embodiments, the primary first electrode 120 has a shape inwardly offset from the shape of the first cavity 110. In some embodiments, the primary second electrode 220 has a shape inwardly offset from the shape of the second cavity 210. In some embodiments, the primary third electrode 320 has a shape inwardly offset from the shape of the third cavity 310. In some embodiments, the secondary first electrode 130 has a shape inwardly offset from the shape of the primary first electrode 120. In some embodiments, the secondary second electrode 230 has a shape inwardly offset from the shape of the primary second electrode 220. In some embodiments, the secondary third electrode 330 has a shape inwardly offset from the shape of the primary third electrode 320.

In some embodiments, the offset between the primary first electrode 120 and the first cavity 110 is equal to the offset between the primary first electrode 120 and the secondary first electrode 130. In some embodiments, the offset between the primary first electrode 120 and the first cavity 110 is greater than the offset between the primary first electrode 120 and the secondary first electrode 130. In some embodiments, the offset between the primary first electrode 120 and the first cavity 110 is less than the offset between the primary first electrode 120 and the secondary first electrode 130.

In some embodiments, the offset between the primary second electrode 220 and the second cavity 210 is equal to the offset between the primary second electrode 220 and the secondary second electrode 230. In some embodiments, the offset between the primary second electrode 220 and the second cavity 210 is greater than the offset between the primary second electrode 220 and the secondary second electrode 230. In some embodiments, the offset between the primary second electrode 220 and the second cavity 210 is less than the offset between the primary second electrode 220 and the secondary second electrode 230.

In some embodiments, the offset between the primary third electrode 320 and the third cavity 310 is equal to the offset between the primary third electrode 320 and the secondary third electrode. In some embodiments, the offset between the primary third electrode 320 and the third cavity 310 is greater than the offset between the primary third electrode 320 and the secondary third electrode. In some embodiments, the offset between the primary third electrode 320 and the third cavity 310 is less than the offset between the primary third electrode 320 and the secondary third electrode.

In some embodiments, the secondary first electrode 130 is coupled to the primary first electrode 120 by a piezoelectric layer 140. In some embodiments, the secondary second electrode 230 is coupled to the primary second electrode 220 by a piezoelectric layer 240. In some embodiments, the secondary third electrode 330 is coupled to the primary third electrode 320 by a piezoelectric layer 340. In some embodiments, at least a portion of the membrane 500 is formed of a ceramic. In some embodiments, the ceramic comprises silicon. In some embodiments, at least a portion of the membrane 500 is formed of silicon and/or silicon dioxide.

In some embodiments, the primary first electrode 120 has a shape inwardly offset from the shape of the first cavity 110. In some embodiments, the primary second electrode 220 has a shape inwardly offset from the shape of the second cavity 210. In some embodiments, the primary third electrode 320 has a shape inwardly offset from the shape of the third cavity 310. In some embodiments, the secondary first electrode 130 has a shape inwardly offset from the shape of the primary first electrode 120. In some embodiments, the secondary second electrode 230 has a shape inwardly offset from the shape of the primary second electrode 220. In some embodiments, the secondary third electrode 330 has a shape inwardly offset from the shape of the primary third electrode 320. In some embodiments, the offset between the first cavity 110 and the primary first electrode 120 is equal to the offset between the secondary first electrode 130 and the primary first electrode 120. In some embodiments, the offset between the first cavity 110 and the primary first electrode 120 is greater than the offset between the secondary first electrode 130 and the primary first electrode 120. In some embodiments, the offset between the first cavity 110 and the primary first electrode 120 is less than the offset between the secondary first electrode 130 and the primary first electrode 120. In some embodiments, the offset between the second cavity 210 and the primary second electrode 220 is equal to the offset between the primary second electrode 220 and the secondary second electrode 230. In some embodiments, the offset between the second cavity 210 and the primary second electrode 220 is greater than the offset between the primary second electrode 220 and the secondary second electrode 230. In some embodiments, the offset between the second cavity 210 and the primary second electrode 220 is less than the offset between the primary second electrode 220 and the secondary second electrode 230. In some embodiments, the offset between the third cavity 310 and the primary third electrode 320 is equal to the offset between the primary third electrode 320 and the secondary third electrode. In some embodiments, the offset between the third cavity 310 and the primary third electrode 320 is greater than the offset between the primary third electrode 320 and the secondary third electrode. In some embodiments, the offset between the third cavity 310 and the primary third electrode 320 is less than the offset between the primary third electrode 320 and the secondary third electrode.

In some embodiments, at least a portion of the membrane 500 has a thickness of about 1 µm to about 10 µm. In some embodiments, at least a portion of the membrane 500 has a thickness of about 1 µm to about 2 µm, about 1 µm to about 3 µm, about 1 µm to about 4 µm, about 1 µm to about 5 µm, about 1 µm to about 6 µm, about 1 µm to about 7 µm, about 1 µm to about 8 µm, about 1 µm to about 9 µm, about 1 µm to about 10 µm, about 2 µm to about 3 µm, about 2 µm to about 4 µm, about 2 µm to about 5 µm, about 2 µm to about 6 µm, about 2 µm to about 7 µm, about 2 µm to about 8 µm, about 2 µm to about 9 µm, about 2 µm to about 10 µm, about 3 µm to about 4 µm, about 3 µm to about 5 µm, about 3 µm to about 6 µm, about 3 µm to about 7 µm, about 3 µm to about 8 µm, about 3 µm to about 9 µm, about 3 µm to about 10 µm, about 4 µm to about 5 µm, about 4 µm to about 6 µm, about 4 µm to about 7 µm, about 4 µm to about 8 µm, about 4 µm to about 9 µm, about 4 µm to about 10 µm, about 5 µm to about 6 µm, about 5 µm to about 7 µm, about 5 µm to about 8 µm, about 5 µm to about 9 µm, about 5 µm to about 10 µm, about 6 µm to about 7 µm, about 6 µm to about 8 µm, about 6 µm to about 9 µm, about 6 µm to about 10 µm, about 7 µm to about 8 µm, about 7 µm to about 9 µm, about 7 µm to about 10 µm, about 8 µm to about 9 µm, about 8 µm to about 10 µm, or about 9 µm to about 10 µm, including increments therein. In some embodiments, at least a portion of the membrane 500 has a thickness of about 1 µm, about 2 µm, about 3 µm, about 4 µm, about 5 µm, about 6 µm, about 7 µm, about 8 µm, about 9 µm, or about 10 µm. In some embodiments, at least a portion of the membrane 500 has a thickness of at least about 1 µm, about 2 µm, about 3 µm, about 4 µm, about 5 µm, about 6 µm, about 7 µm, about 8 µm, or about 9 µm. In some embodiments, at least a portion of the membrane 500 has a thickness of at most about 2 µm, about 3 µm, about 4 µm, about 5 µm, about 6 µm, about 7 µm, about 8 µm, about 9 µm, or about 10 µm.

MUT Arrays

Figure 4:
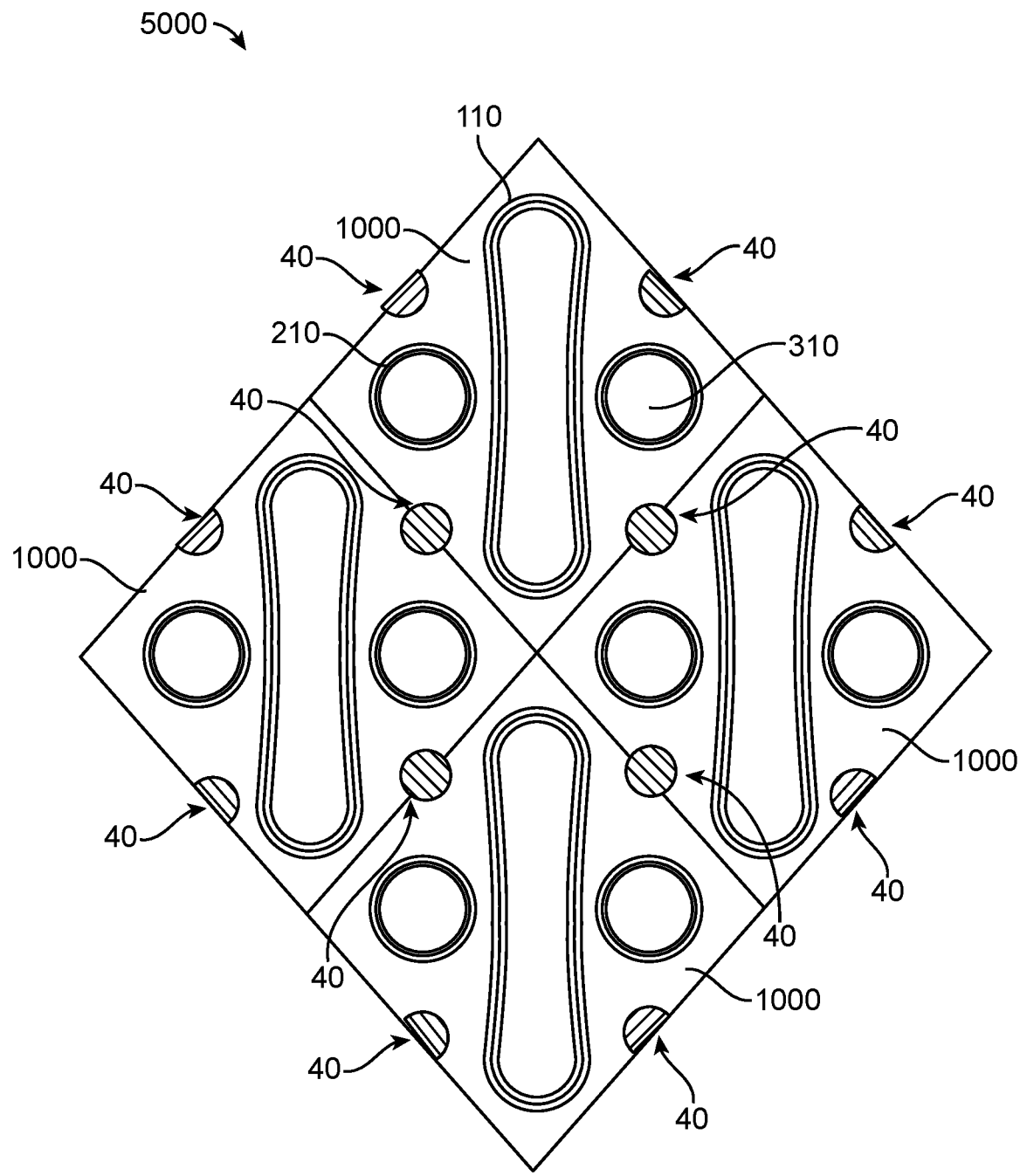
FIG. 4 shows a top-view illustration of an exemplary imaging device, per one or more embodiments herein.

Another aspect provided herein, per FIG. 4, is an array 4000 of the MUTs 1000. As shown, the array 4000 comprises a rhomboid array of the MUTs 1000. In some embodiments, the array comprises a rectilinear array. In some embodiments, the array comprises a polar array. In some embodiments, the array comprises or a polygonal array. In some embodiments, the polygonal array 4000 comprises a triangular array, a pentagonal array, a parallelogram array, a rhomboid array, a hexagonal array, or an octagonal array.

In some embodiments, the substrate of two or more adjacent MUTs 1000 in the array 4000 are continuous. In some embodiments, the membrane of two or more adjacent MUTs 1000 in the array 4000 are continuous. In some embodiments, one or more cross-talk reduction elements 40 are positioned in between adjacent MUTs 1000. In some embodiments, the one or more cross-talk reduction elements 40 are located at the edges of each MUT 1000. In some embodiments, the one or more cross-talk elements 40 comprise one or more of grooves, trenches, or the like made into substrate of the MUTs 1000 and/or an acoustic dampening material placed therein and/or on the surfaces of the substrate 100 and/or diaphragm 500.

As described herein, the MUTs 1000 in the MUT arrays 4000 described herein are pMUTs. Alternatively or in combination, one or more MUTs 1000 in the MUT arrays 4000 are capacitive micromachined ultrasound transducers (cMUTs) and the MUT cavities as described herein are sandwiched between their accompanying electrode pairs, with one electrode of the pair being coupled to a membrane or portion thereof. Optionally, a resonant cavity can be connected to the cMUT.

Imaging Assemblies

Figure 6:
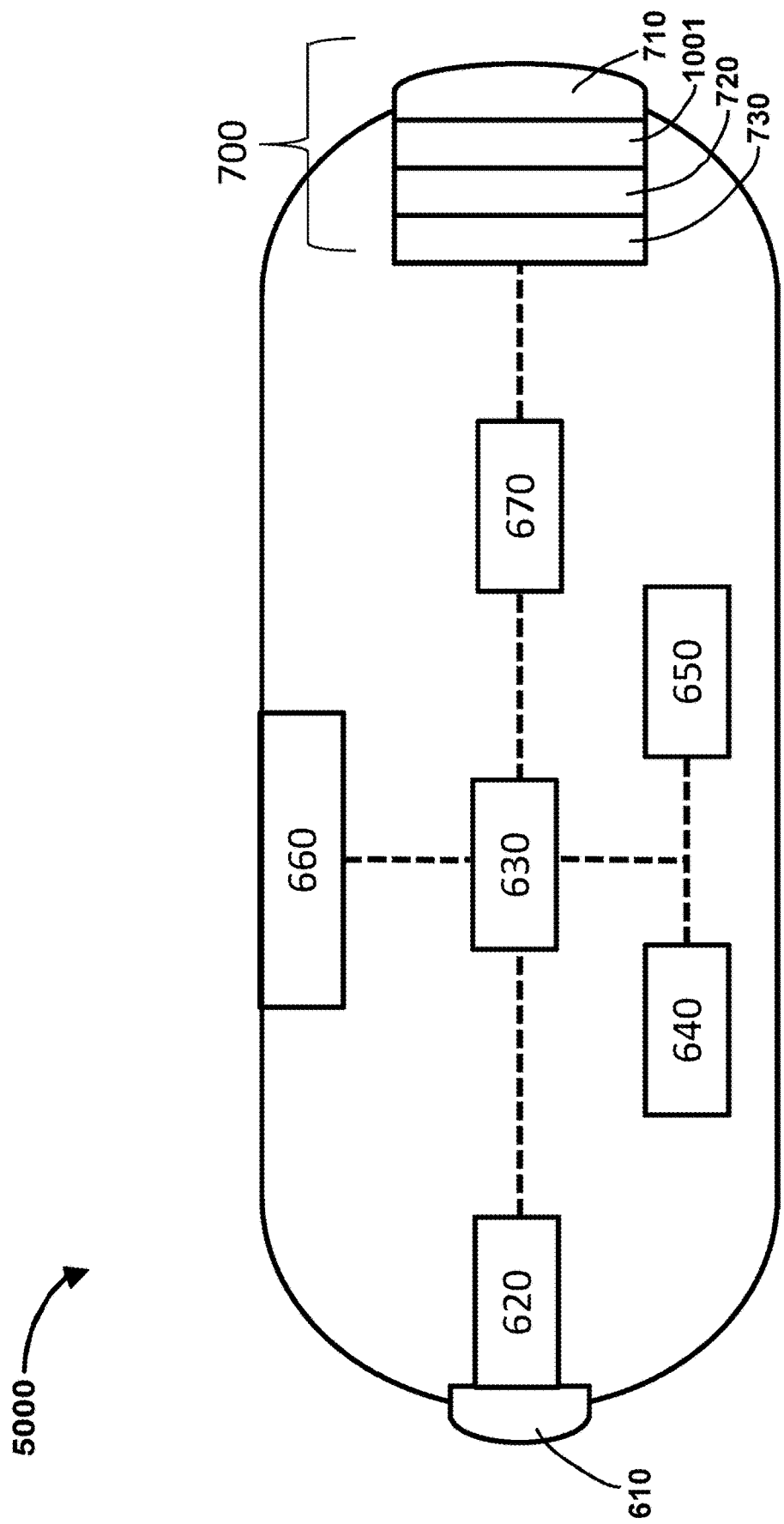
FIG. 6 shows a diagram of an exemplary imaging assembly, per one or more embodiments herein.

Another aspect provided herein, per FIG. 6, is an imaging assembly 5000. As shown, the imaging assembly 5000 comprises a components circuit 630, a memory 640, a communication unit 650 (to receive and/or transmit signals externally, for example), a signal processing circuit 670, and an imaging subassembly 700. In some embodiments, the components circuit 630 comprises an input/output (IO) bus. In some embodiments, as shown, the imaging subassembly 700 comprises an acoustic absorbent layer 730, a control unit 720, the imaging array 1001, and a coating layer 710. In some embodiments, the imaging array 1001 comprises an array of MUTs as described herein. In some embodiments, the control unit 720 comprises an Application Specific Integrated Circuit (ASIC) coupled to the imaging array 1001. In some embodiments, the ASIC is configured to individually address each MUT of the imaging array 1001, each MUT comprising a first cavity and complementary electrode pair and at least one second cavity and complementary electrode pair as described herein. In some embodiments, the ASIC is configured to digitize the analog receive signal of each MUT of the imaging array 1001. In some embodiments, the ultrasound signals transmitted and received from each MUT will correspond to a single pixel in an ultrasound image, as processed by the ASIC. In some embodiments, the ultrasound signals received from a multiplicity of MUTs will be combined together as a single pixel.

In some embodiments, the imaging assembly 5000 further comprises a power source 620 such as a battery (primary and/or rechargeable), a charging port 610, a display 660, or any combination thereof electrically coupled to the components circuit 630, the memory 640, the communication unit 650, the signal processing unit 670, the imaging subassembly 700, or any combination thereof. In some embodiments, one or more of the components circuit 630, the memory 640, the communication unit 650, the signal processing unit 670, and the imaging subassembly 700 are electrically coupled. In some embodiments, the acoustic absorbent layer 730 is proximal to the control unit 720, the control unit 720 is proximal to the imaging array 1001, the imaging array 1001 is proximal to the coating layer 710, or any combination thereof. In some embodiments, the acoustic absorbent layer 730 is proximal to the imaging device 1001, wherein the control unit 720 mesial to the absorbent layer 730. In some embodiments, the coating layer 710 is distal to the imaging device 1000, the imaging device 1000 is distal to the control unit 720, the control unit 720 is distal to the acoustic absorbent layer 730, or any combination thereof. In some embodiments, the coating layer 710 comprises an acoustic lens and/or matching layer.

MUT Performance

Figure 7:
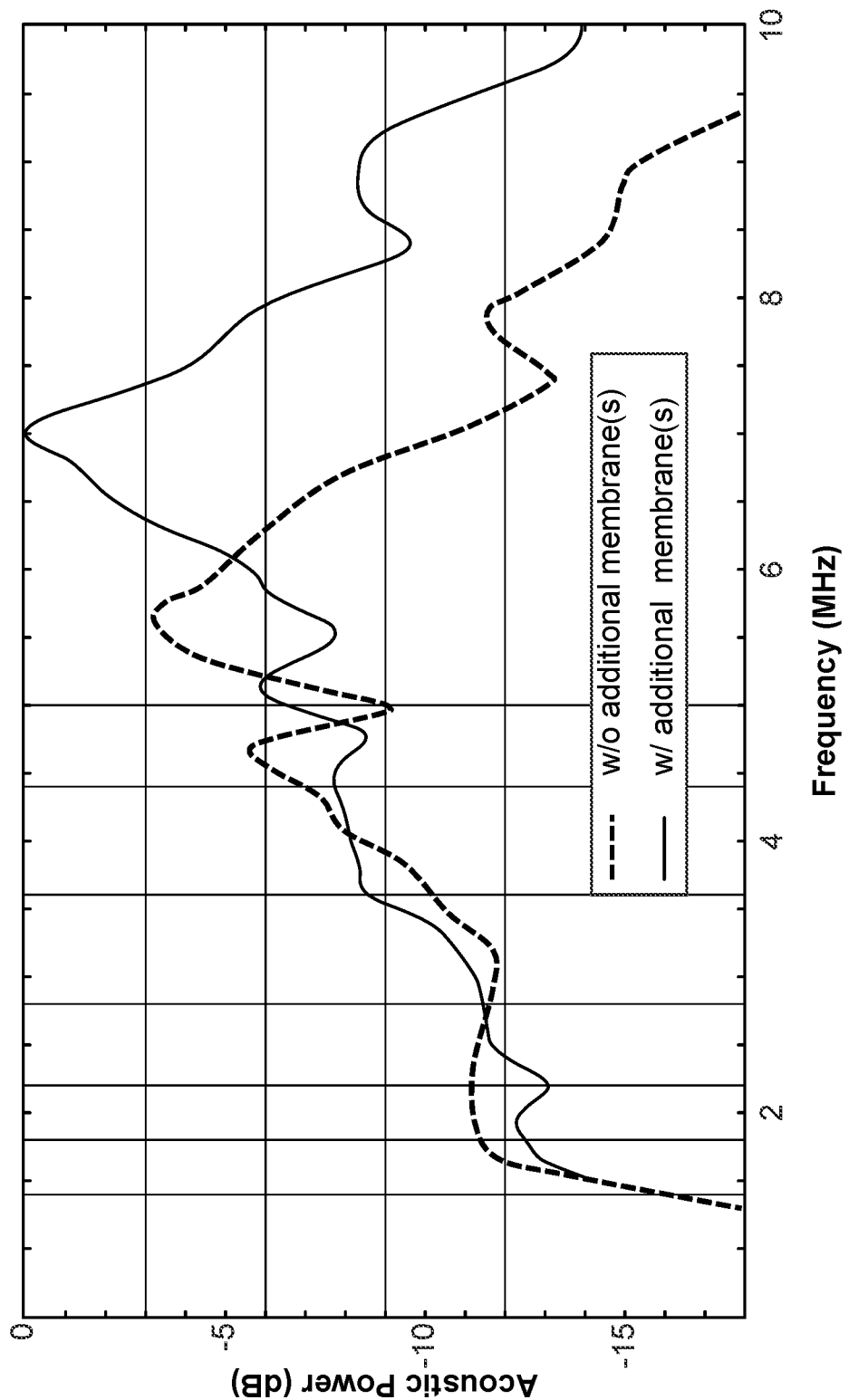
FIG. 7 shows a graph of frequency vs. acoustic power for MUTs with and without the second and third membrane portions, per one or more embodiments herein.

Arrays of MUTs according to one or more embodiments described herein have been modeled. FIG. 7 shows a graph of frequency vs. acoustic power for the MUTs with and without additional membrane(s) and resonant cavitie(s), for example, a MUT 1000 versus a MUT similar to MUT 1000 including only the central resonant cavity 110 and associated membrane, piezoelectric layer, and electrode components. As shown, the inclusion of the additional membrane(s) and resonant cavitie(s) translated the peak frequency from about 5 MHz to about 7 MHz and increased the peak acoustic power by about 3 dB. The additional membrane(s) and resonant cavitie(s) for the MUT provide stronger frequency response at higher frequencies (e.g., >5 MHz).

Figure 8A:
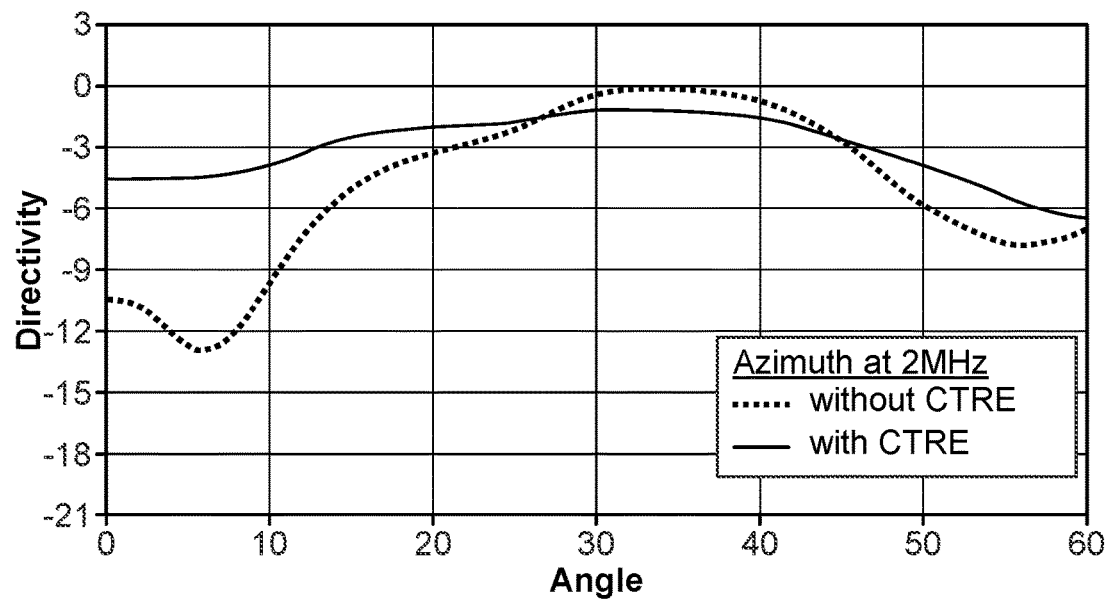
FIG. 8A shows a graph comparing directivity at 2 MHz with and without cross-talk reduction elements, per one or more embodiments herein.
Figure 8B:
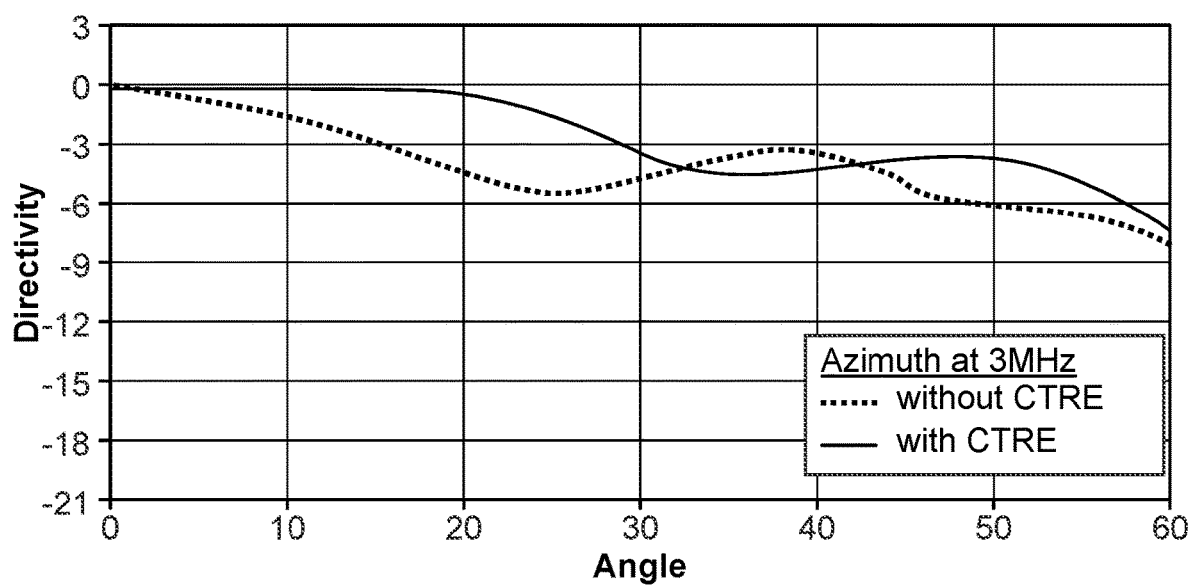
FIG. 8B shows a graph comparing directivity at 3 MHz with and without cross-talk reduction elements, per one or more embodiments herein.
Figure 8C:
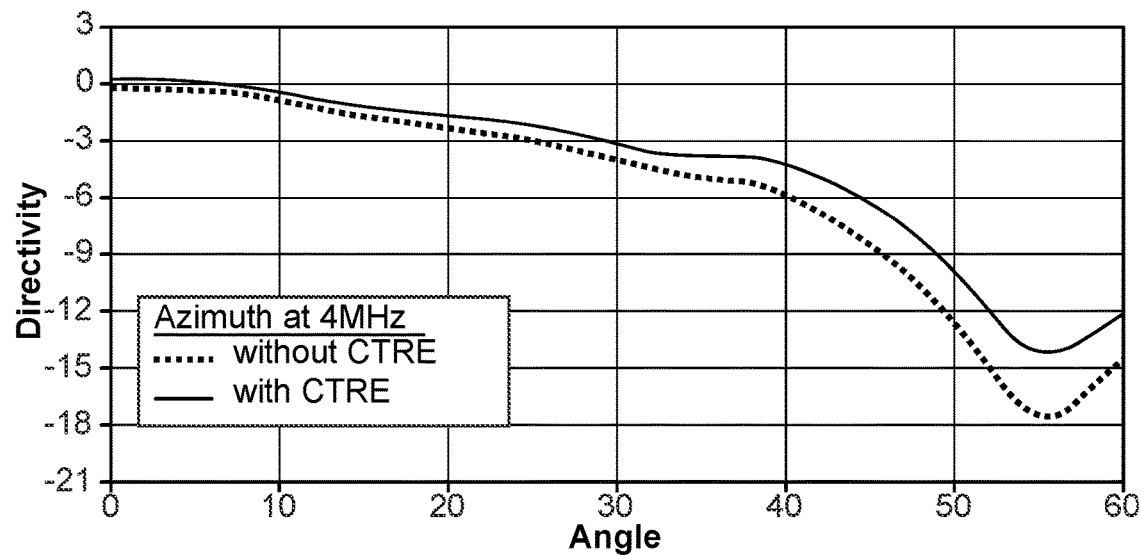
FIG. 8C shows a graph comparing directivity at 4 MHz with and without cross-talk reduction elements, per one or more embodiments herein.
Figure 8D:
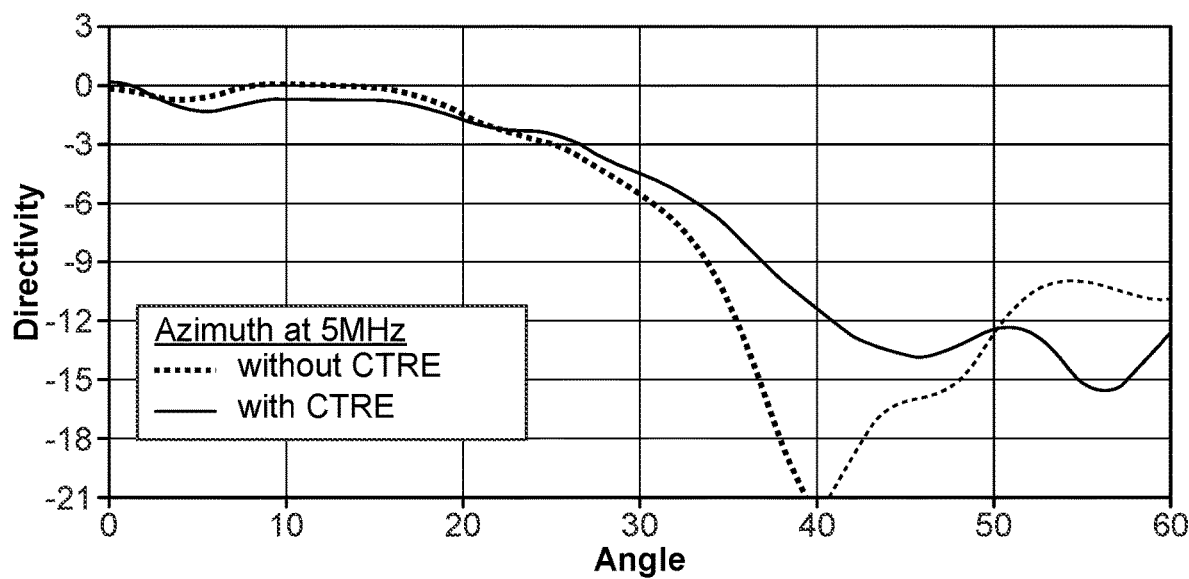
FIG. 8D shows a graph comparing directivity at 5 MHz with and without cross-talk reduction elements, per one or more embodiments herein.

Models to evaluate the MUTs with and without cross-talk reducing elements (CTREs) according to one or more embodiments described herein were also conducted. FIG. 8A shows a graph comparing directivity at 2 MHz with and without the cross-talk reducing elements. FIG. 8B shows a graph comparing directivity at 3 MHz with and without the CTREs. FIG. 8C shows a graph comparing directivity at 4 MHz with and without the CTREs. FIG. 8D shows a graph comparing directivity at 5 MHz with and without the CTREs. As shown, employing the CTREs (e.g., CTREs described herein) can improve the directivity of the exemplary MUT arrays over a large frequency range. In particular, the curves for directivity at different angles are flattened with the inclusion of the CTREs.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein the term "mesial" refers to a portion between two or more distal portions, or a portion towards a geometrical middle of an object.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A micromachined ultrasonic transducer (MUT), comprising:
    a substrate having a first resonant cavity, a second resonant cavity, and a third resonant cavity;
    a membrane coupled to the substrate and having first, second, and third portions that cover the first, second, and third resonant cavities, respectively;
    a primary first electrode coupled to the first portion of the membrane, and a secondary first electrode coupled to the primary first electrode;
    a primary second electrode coupled to the second portion of the membrane, and a secondary second electrode coupled to the primary second electrode; and
    a primary third electrode coupled to the third portion of the membrane and a secondary third electrode coupled to the primary third electrode.

2. The MUT of claim 1, wherein the first cavity, the second cavity, the third cavity, or any combination thereof have a shape of a circle, an oval, a half-circle, a half-oval, a triangle, a square, a rectangle a hexagon, or an octagon.

3. The MUT of claim 2, wherein the second cavity and the third cavity have a shape of a circle.

4. The MUT of claim 3, wherein the second cavity has a greater diameter than the third cavity.

5. The MUT of claim 3, wherein the second cavity has a smaller diameter than the third cavity.

6. The MUT of claim 3, wherein the second cavity and the third cavity have equivalent diameters.

7. The MUT of claim 3, wherein the second cavity and the third cavity are asymmetrical about a ray bisecting the first cavity.

8. The MUT of claim 3, wherein the second cavity and the third cavity are symmetrical about a ray bisecting the first cavity.

9. The MUT of claim 8, wherein a ratio between a distance between the ray bisecting the first cavity and the center of the second cavity, and a diameter of the second cavity, is about 1:0.3 to about 1:1.

10. The MUT of claim 1, wherein the first cavity has a shape comprising:
    (a) a primary rounded distal portion having a primary diameter;
    (b) a secondary rounded distal portion having a secondary diameter; and
    (c) a mesial portion between the primary distal portion and the secondary distal portion.

11. The MUT of claim 10, wherein the first cavity is symmetric about:
    (a) a ray extending from a centerpoint of the primary rounded distal portion to a centerpoint of the secondary rounded distal portion;
    (b) a ray bisecting the mesial portion; or
    (c) both.

12. The MUT of claim 10, wherein a ratio between a distance from the center of the primary rounded distal portion to the center of the secondary distal rounded portion, and a diameter of the primary rounded distal portion, the secondary rounded distal portion, or both is about 3:1 to about 5:1.

13. The MUT of claim 10, wherein a ratio between a distance from the center of the primary rounded distal portion to the center of the secondary distal rounded portion, and a minimum width of the mesial portion is about 2:1 to about 7:1.

14. The MUT of claim 10, wherein a ratio between and a diameter of the primary rounded distal portion, the secondary rounded distal portion, or both, and a minimum width of the mesial portion is about 1:1 to about 3:1.

15. The MUT of claim 1, further comprising one or more portions of a piezoelectric layer, wherein:
    (a) the secondary first electrode is coupled to the primary first electrode by a first portion of the one or more piezoelectric layer portions;
    (b) the secondary second electrode is coupled to the primary second electrode by a second portion of the one or more piezoelectric layer portions;
    (c) the secondary third electrode is coupled to the primary third electrode by a third portion of the one or more piezoelectric layer portions; or
    (d) any combination thereof.

16. The MUT of claim 1, wherein:
    (a) the primary first electrode has a shape inwardly offset from the shape of the first cavity;
    (b) the primary second electrode has a shape inwardly offset from the shape of the second cavity;
    (c) the primary third electrode has a shape inwardly offset from the shape of the third cavity; or
    (d) any combination thereof.

17. The MUT of claim 16, wherein:
    (a) the secondary first electrode has a shape inwardly offset from the shape of the primary first electrode;
    (b) the secondary second electrode has a shape inwardly offset from the shape of the primary second electrode;
    (c) the secondary third electrode has a shape inwardly offset from the shape of the primary third electrode; or
    (d) any combination thereof.

18. The MUT of claim 1, wherein:
    (a) the secondary first electrode is coupled to the primary first electrode by a first piezoelectric layer;
    (b) the secondary second electrode is coupled to the primary the secondary electrode is coupled to the primary first electrode by a first piezoelectric layer;
    (c) the secondary third electrode is coupled to the primary third electrode by a first piezoelectric layer; or
    (d) any combination thereof.

19. The MUT of claim 1, wherein at least a portion of the membrane is formed of a plastic, a ceramic, or both.

20. The MUT of claim 19, wherein at least a portion of the membrane is formed of the ceramic, and wherein the ceramic comprises silicon.

21. The MUT of claim 1, wherein at least a portion of the membrane has a thickness of about 1 µm to about 10 µm.

22. The MUT of claim 1, wherein the MUT has a higher acoustic power at high frequencies than the same MUT without the second cavity, second portion of the membrane covering the second cavity, primary second electrode, and secondary second electrode.

23. The MUT of claim 22, wherein the high frequencies comprise ultrasound frequencies greater or equal to 5 MHz.

24. An imaging device, comprising an array of micromachined ultrasonic transducers (MUTs), wherein each of the MUTs comprises:
    a substrate that comprises a plurality of resonant cavities that each have a circular shape and a diameter different from another of the plurality of resonant cavities;
    a membrane that is coupled to and covering each of the plurality of resonant cavities; and
    a plurality of piezoelectric stacks, each piezoelectric stack being coupled to the membrane over a respective one of the each of the plurality of resonant cavities.

25. The device of claim 24, wherein the array comprises a rectilinear array, a polar array, or a polygonal array.

26. The device of claim 24, wherein the substrate, the membrane, or both of two or more adjacent MUTs in the array are continuous.

27. The device of claim 26, further comprising one or more cross-talk reduction elements disposed between adjacent MUTs in the array.

28. The device of claim 27, wherein the one or more cross-talk reduction elements comprise a groove, a trench, an acoustic dampening material, or combinations thereof disposed between adjacent MUTs in the array.

29. The device of claim 24, further comprising an Application Specific Integrated Circuit (ASIC) coupled to the array the MUTs.

30. The device of claim 29, wherein the ASIC is configured to individually address each of the MUTs.

31. The device of claim 29, wherein each MUT represents a single pixel of an ultrasound image to be obtained by the device.

32. An imaging assembly comprising:
    (a) a components circuit;
    (b) a memory;
    (c) a communication unit;
    (d) a signal processing circuit; and
    (e) an imaging subassembly comprising:
        (i) an acoustic absorbent layer;
        (ii) a control unit;
        (iii) the imaging device of claim 24; and
        (iv) a coating layer.

33. The imaging assembly of claim 32, further comprising a power source, a charging port, a display, or any combination thereof electrically coupled to the components circuit, the memory, the communication unit, the signal processing circuit, the imaging subassembly, or any combination thereof.

34. The imaging assembly of claim 33, wherein the power source comprises a battery.

35. The imaging assembly of claim 32, wherein one or more of the components circuit, the memory, the communication unit, the signal processing circuit, and the imaging subassembly are electrically coupled.

36. The imaging assembly of claim 32, wherein:
(a) the acoustic absorbent layer is proximal to the control unit;
(b) the control unit is proximal to the imaging device;
(c) the imaging device is proximal to the coating layer; or
(d) any combination thereof.

37. The imaging assembly of claim 32, wherein:
(a) the coating layer is distal to the imaging device;
(b) the imaging device is distal to the control unit;
(c) the control unit is distal to the acoustic absorbent layer; or
(d) any combination thereof.

38. The imaging assembly of claim 32, wherein the acoustic absorbent layer is proximal or distal to the acoustic array.

39. The imaging assembly of claim 32, wherein the control unit comprises an Application Specific Integrated Circuit (ASIC) coupled to the array of the MUTs.

40. The imaging assembly of claim 32, wherein the coating layer comprises an acoustic lens.

* * * * *